(12) United States Patent
Ito et al.

(10) Patent No.: US 10,277,723 B2
(45) Date of Patent: *Apr. 30, 2019

(54) INFORMATION PROCESSING TO PREVENT OPERATION MALFUNCTION IN USAGE OF DEVICE

(71) Applicant: SONY CORPORATION, Tokyo (JP)

(72) Inventors: Ryogo Ito, Tokyo (JP); Kazuma Akamatsu, Tokyo (JP); Shunsuke Katsumata, Kanagawa (JP); Shiro Eshita, Tokyo (JP); Megumi Takagi, Kanagawa (JP); Ayumi Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/023,798

(22) PCT Filed: Nov. 10, 2014

(86) PCT No.: PCT/JP2014/005623
§ 371 (c)(1),
(2) Date: Mar. 22, 2016

(87) PCT Pub. No.: WO2015/075888
PCT Pub. Date: May 28, 2015

(65) Prior Publication Data
US 2016/0269514 A1  Sep. 15, 2016

(30) Foreign Application Priority Data

Nov. 19, 2013  (JP) .................................. 2013-238402

(51) Int. Cl.
*H04M 1/02*  (2006.01)
*H04M 1/725*  (2006.01)

(52) U.S. Cl.
CPC ....... *H04M 1/0264* (2013.01); *H04M 1/0256* (2013.01); *H04M 1/7253* (2013.01)

(58) Field of Classification Search
USPC ...................................................... 455/556.1
See application file for complete search history.

(56) References Cited

U.S. PATENT DOCUMENTS

| | | | |
|---|---|---|---|
| 9,742,978 B2* | 8/2017 | Ito | H04N 5/23206 |
| 2006/0099939 A1* | 5/2006 | Uchikawa | H04M 1/72525 455/418 |

(Continued)

FOREIGN PATENT DOCUMENTS

| | | |
|---|---|---|
| EP | 3041218 A1 | 7/2016 |
| JP | 2001-045362 A | 2/2001 |

(Continued)

OTHER PUBLICATIONS

Office Action for JP Patent Application No. 2013-238402, dated Feb. 21, 2017, 06 pages of Office Action.

(Continued)

*Primary Examiner* — Lana N Le
(74) *Attorney, Agent, or Firm* — Chip Law Group

(57) ABSTRACT

An information acquiring device includes an information acquiring control circuit; or an information processing device includes an information processing circuit. The circuit prevents an operation of the information processing device and/or an information acquiring device based on the presence of a connection between the information acquiring device and the information processing device.

19 Claims, 15 Drawing Sheets

(56) References Cited

U.S. PATENT DOCUMENTS

| | | | | |
|---|---|---|---|---|
| 2006/0268158 | A1* | 11/2006 | Ishiyama | H04N 5/23203 348/373 |
| 2007/0092280 | A1* | 4/2007 | Nakazato | G03G 15/5004 399/75 |
| 2011/0212687 | A1* | 9/2011 | Foster | H04M 1/72577 455/41.1 |
| 2014/0223323 | A1* | 8/2014 | Kasahara | G06F 3/1423 715/740 |
| 2015/0024732 | A1* | 1/2015 | Yamashita | H04M 1/7253 455/419 |
| 2015/0365783 | A1* | 12/2015 | Akimoto | H04W 4/008 455/41.1 |
| 2015/0373769 | A1* | 12/2015 | Wang | H04W 4/008 455/419 |
| 2016/0072553 | A1* | 3/2016 | Tanji | H04B 5/0031 455/41.1 |
| 2016/0088423 | A1* | 3/2016 | Takagi | H04W 4/008 455/552.1 |
| 2016/0183318 | A1* | 6/2016 | Luo | H04L 67/00 455/556.1 |
| 2017/0094156 | A1* | 3/2017 | Kim | G06F 3/013 |
| 2017/0187945 | A1* | 6/2017 | Ikeda | G02B 7/08 |
| 2017/0187946 | A1* | 6/2017 | Kozakura | H04N 1/4433 |
| 2017/0195577 | A1* | 7/2017 | Mitani | H04N 5/23203 |
| 2017/0351335 | A1* | 12/2017 | Kim | G06F 3/01 |
| 2018/0191893 | A1* | 7/2018 | Shinomiya | H04M 1/72577 |
| 2018/0336415 | A1* | 11/2018 | Anorga | G06K 9/00671 |

FOREIGN PATENT DOCUMENTS

| | | | | |
|---|---|---|---|---|
| JP | 2003-046835 A | | 2/2003 | |
| JP | 2004-361464 A | | 12/2004 | |
| JP | 2013-013062 A | | 1/2013 | |
| JP | 2013-093820 A | | 5/2013 | |
| JP | 2013093820 A | * | 5/2013 | ......... H04N 5/23206 |
| JP | 2013-165373 A | | 8/2013 | |

OTHER PUBLICATIONS

Office Action for EP Patent Application No. 14805367.1, dated Nov. 23, 2017, 04 pages.

* cited by examiner

[Fig. 1]
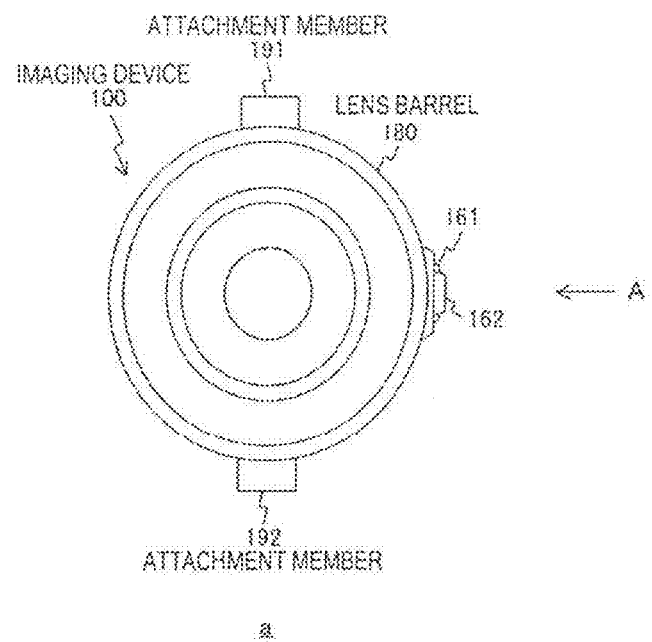
a
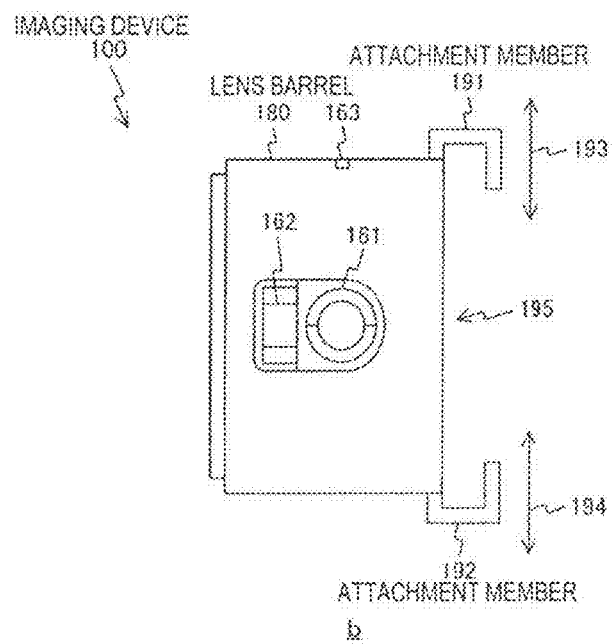
b

[Fig. 2]
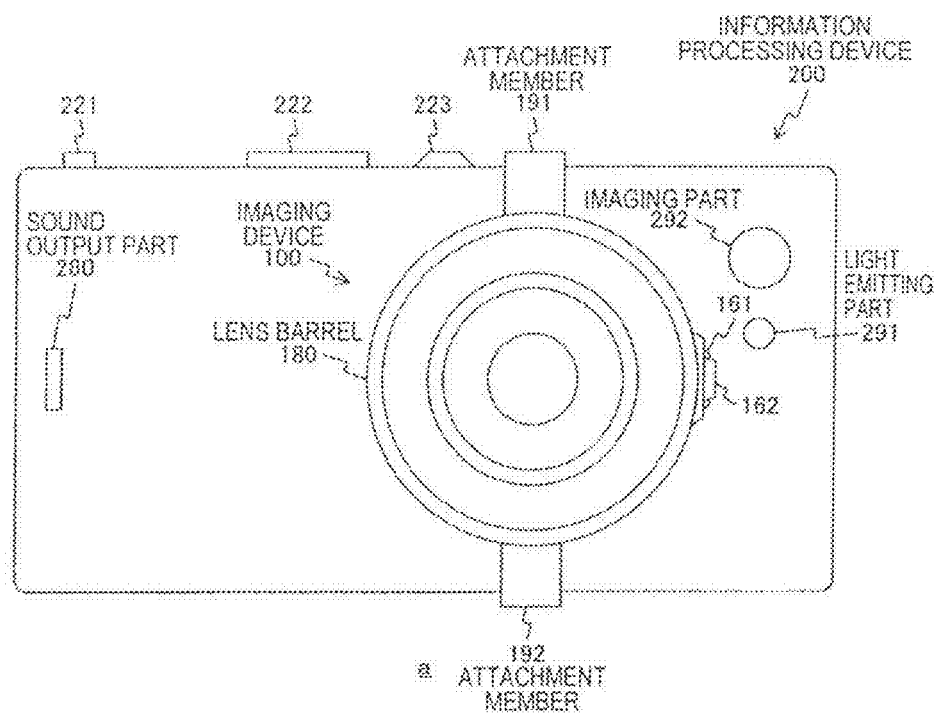
a
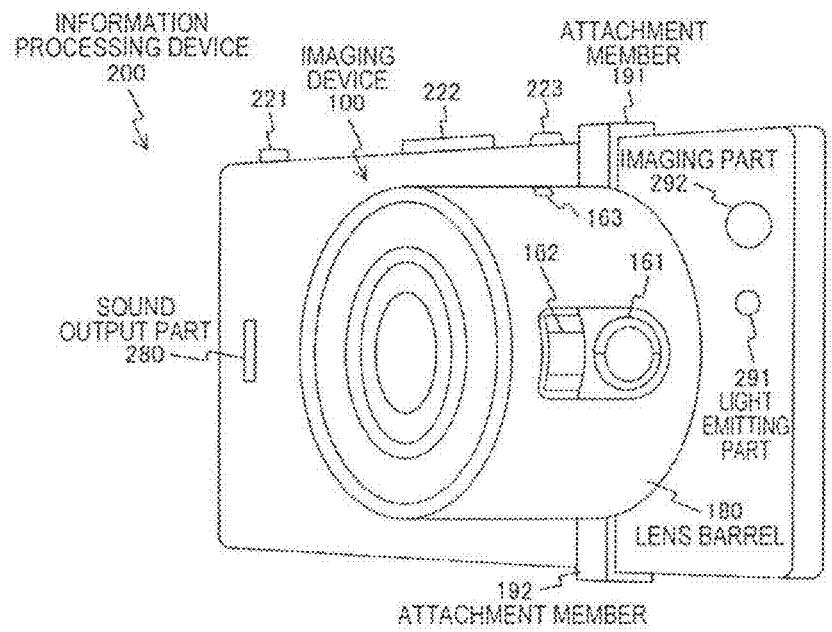
b

[Fig. 3]
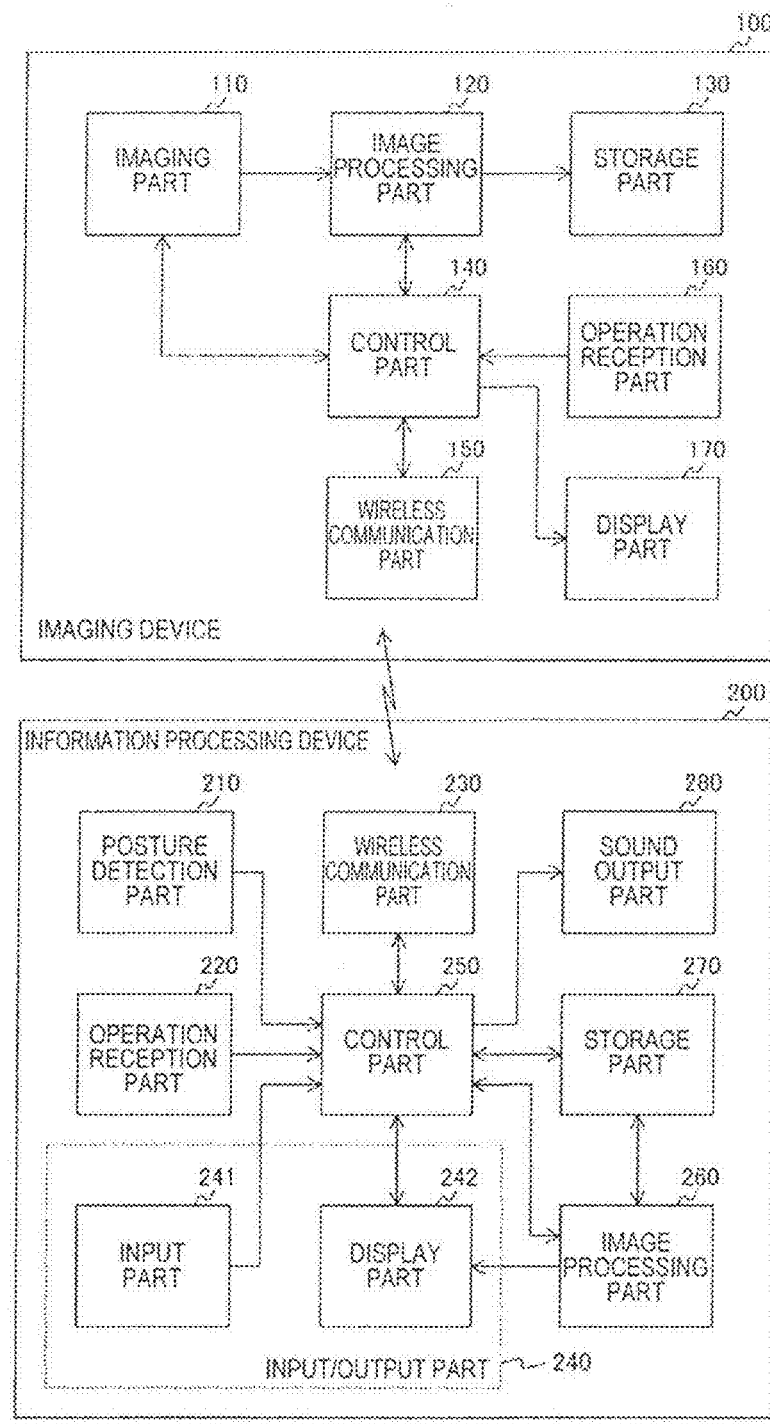

[Fig. 4]
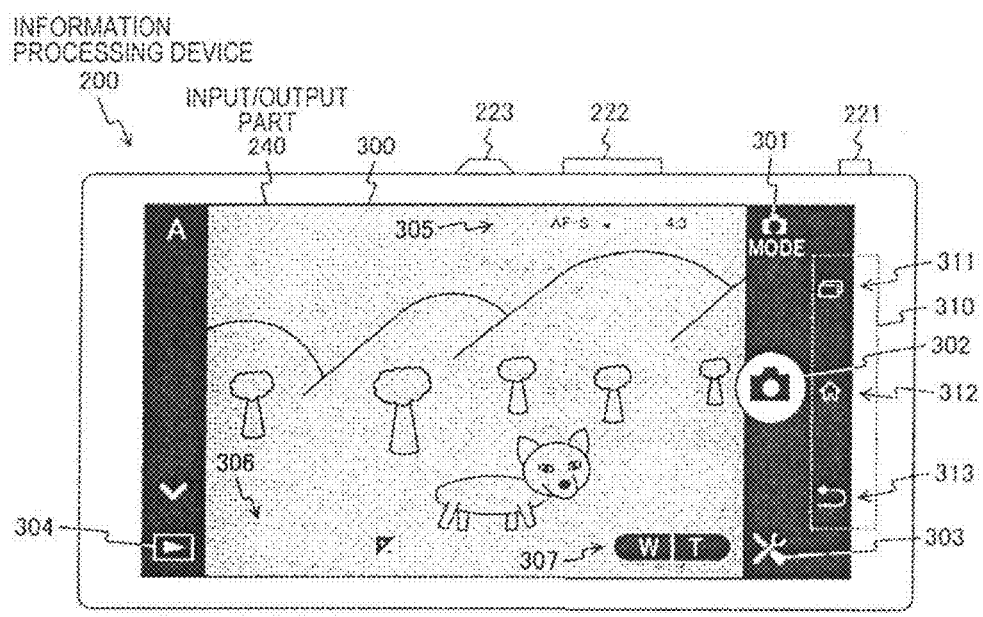

[Fig. 5]
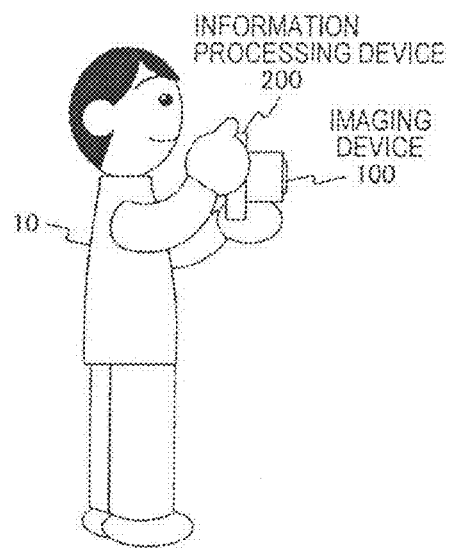
a
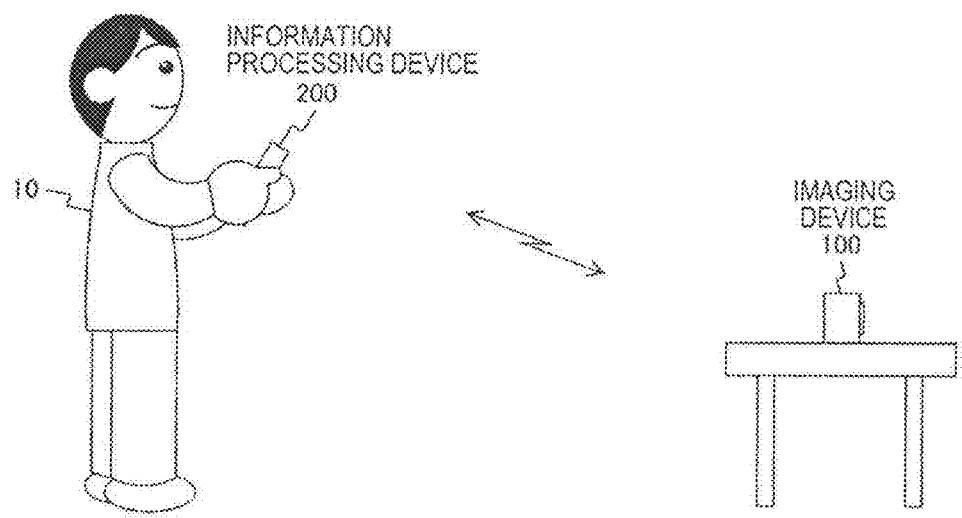
b

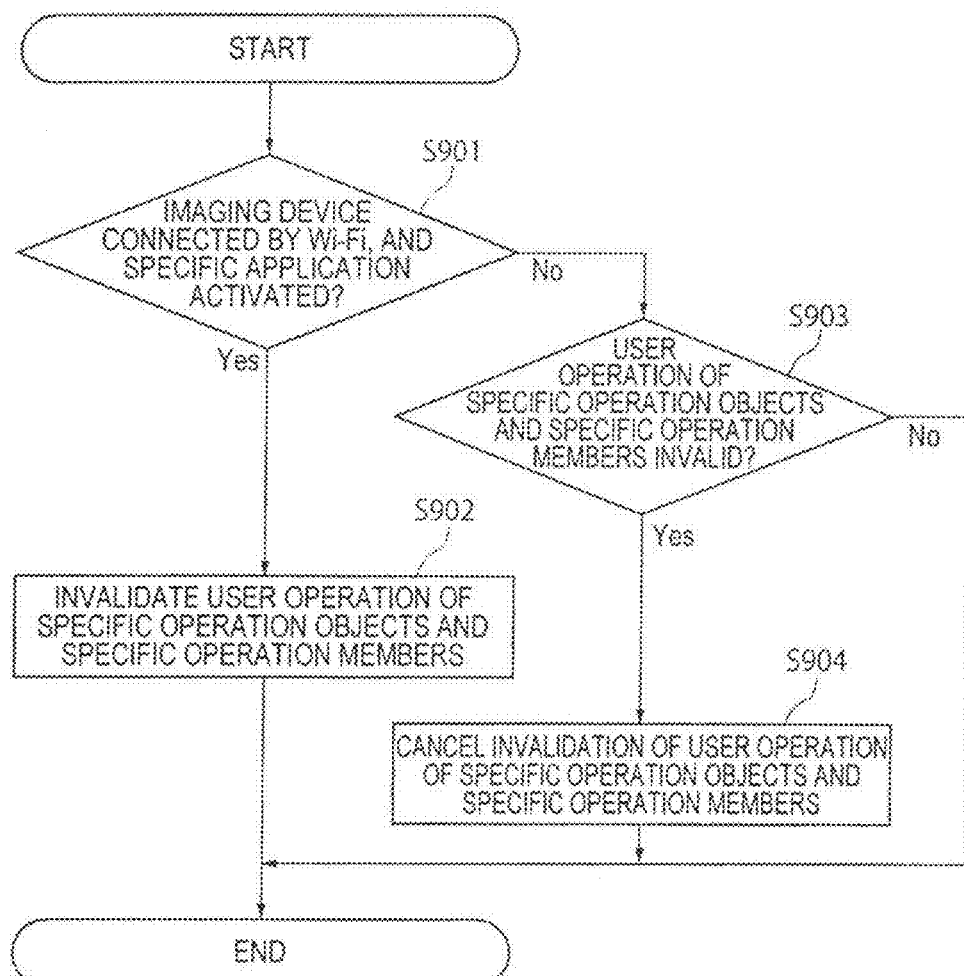

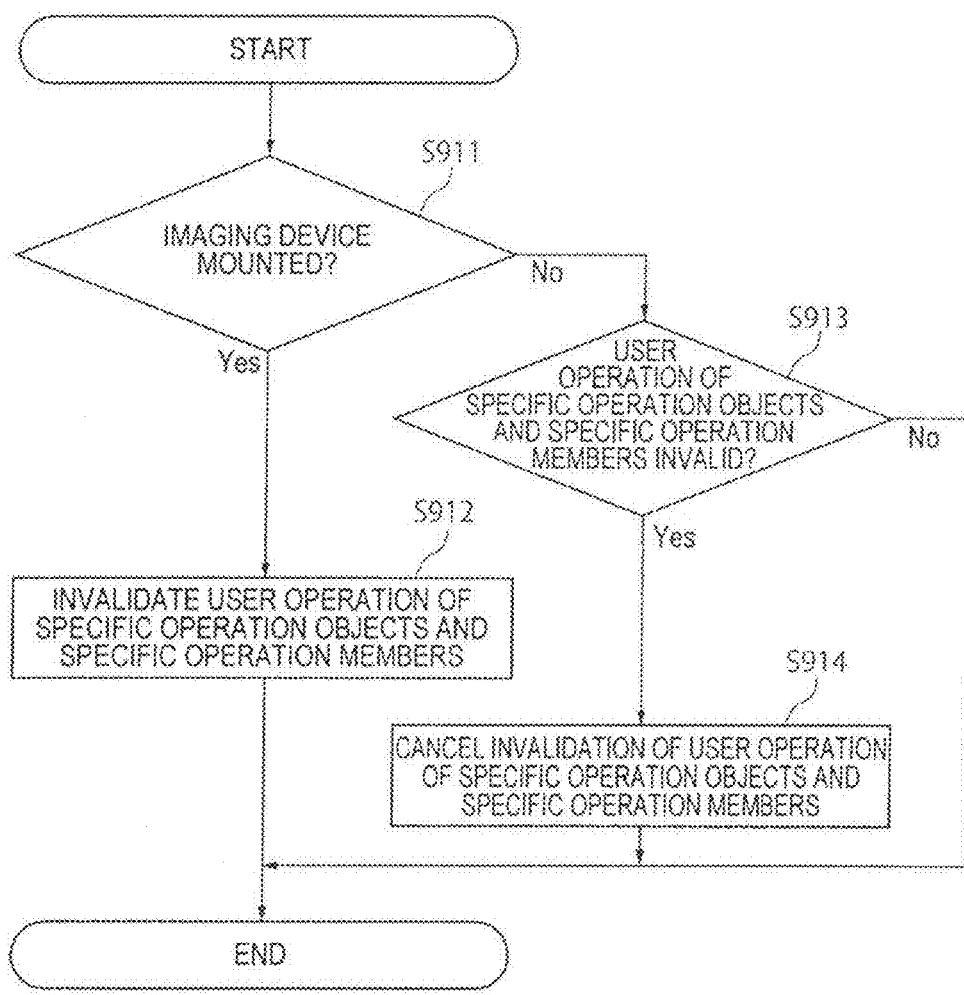

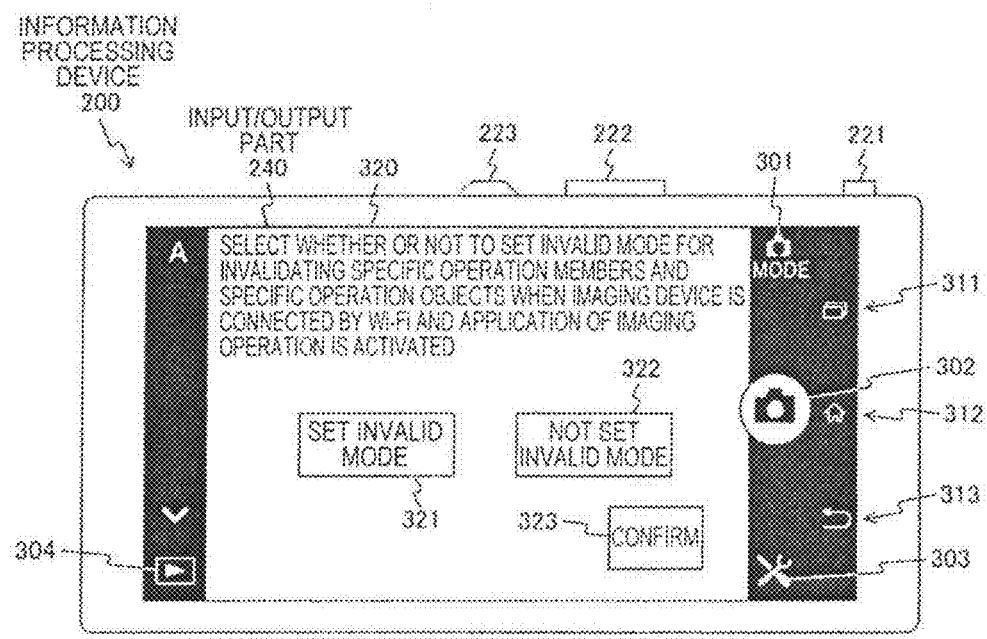
[Fig. 8]

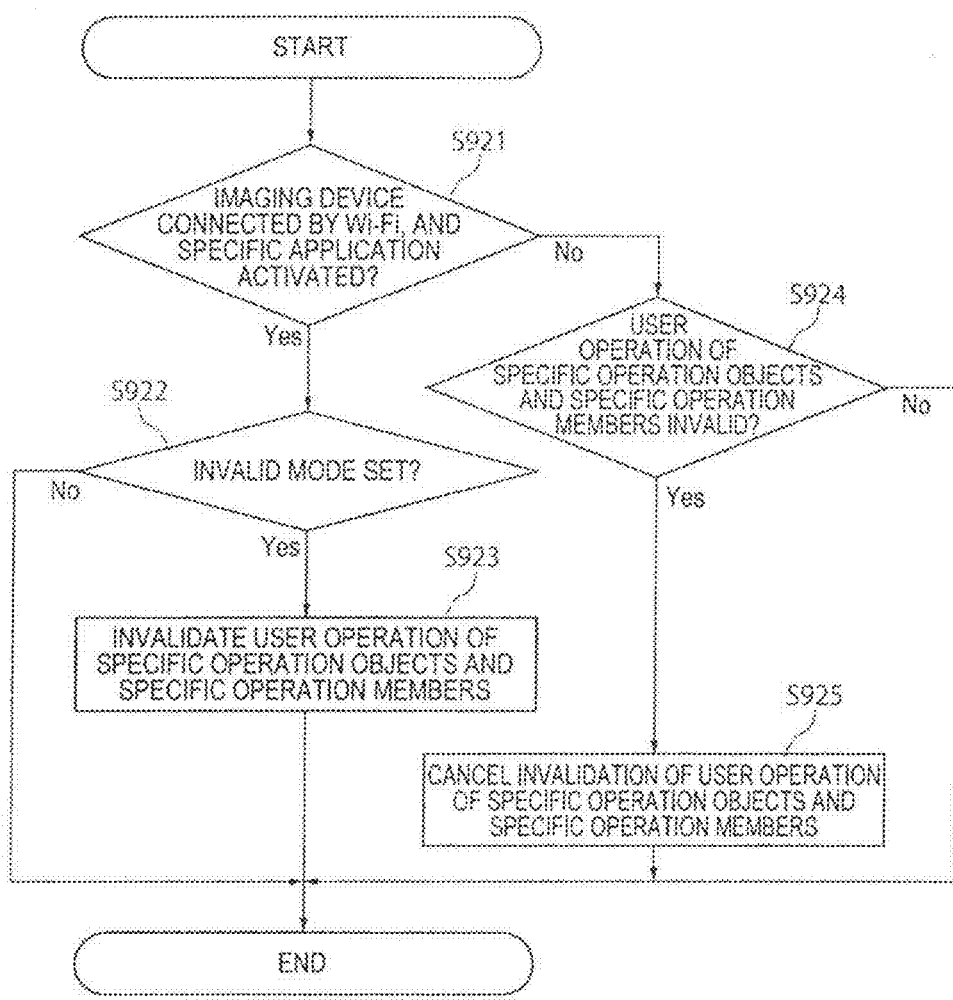
[Fig. 9]

[Fig. 10]
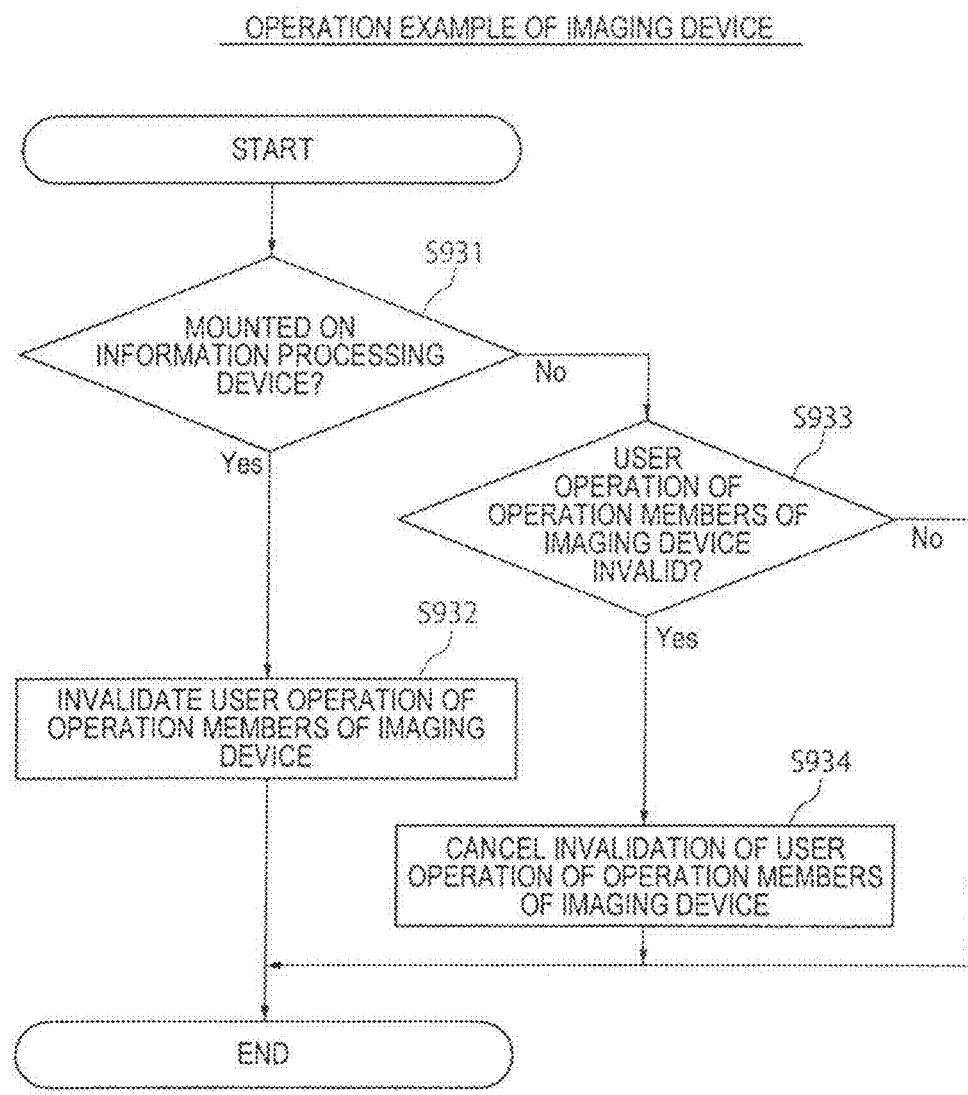

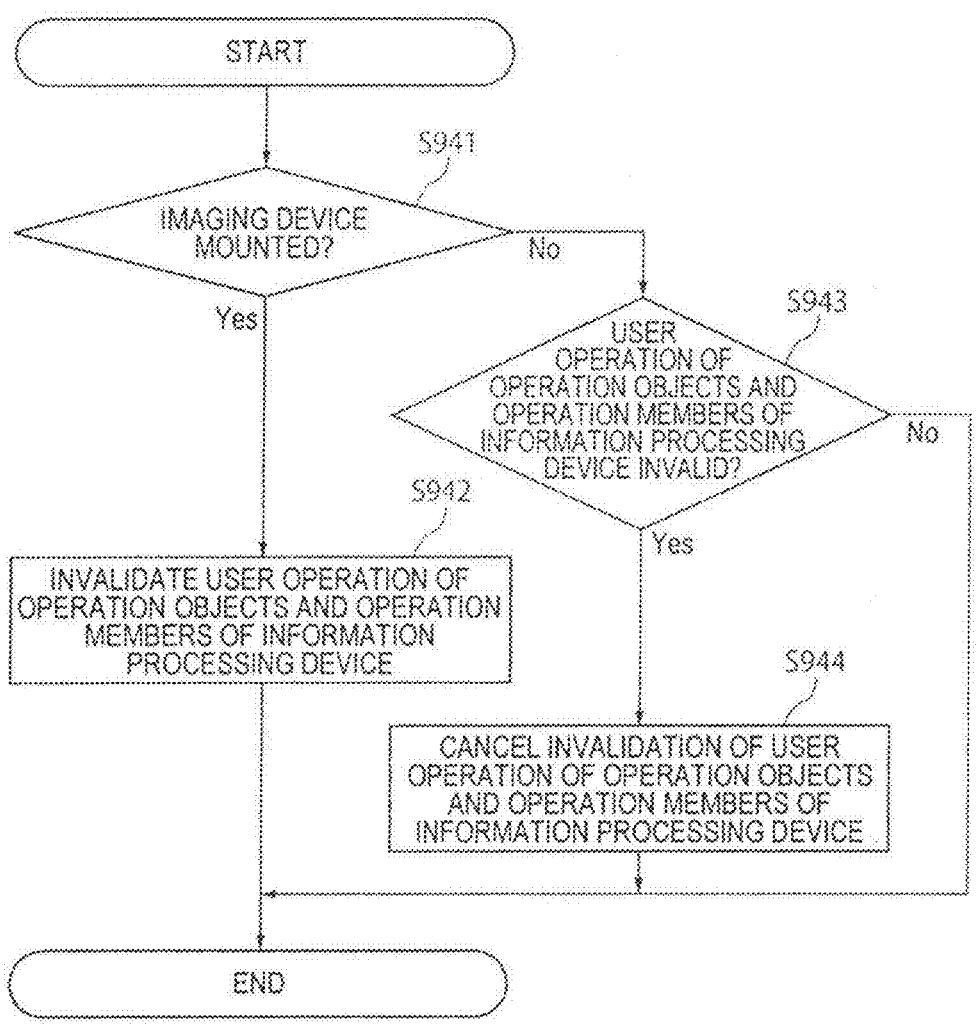
[Fig. 11]

[Fig. 12]
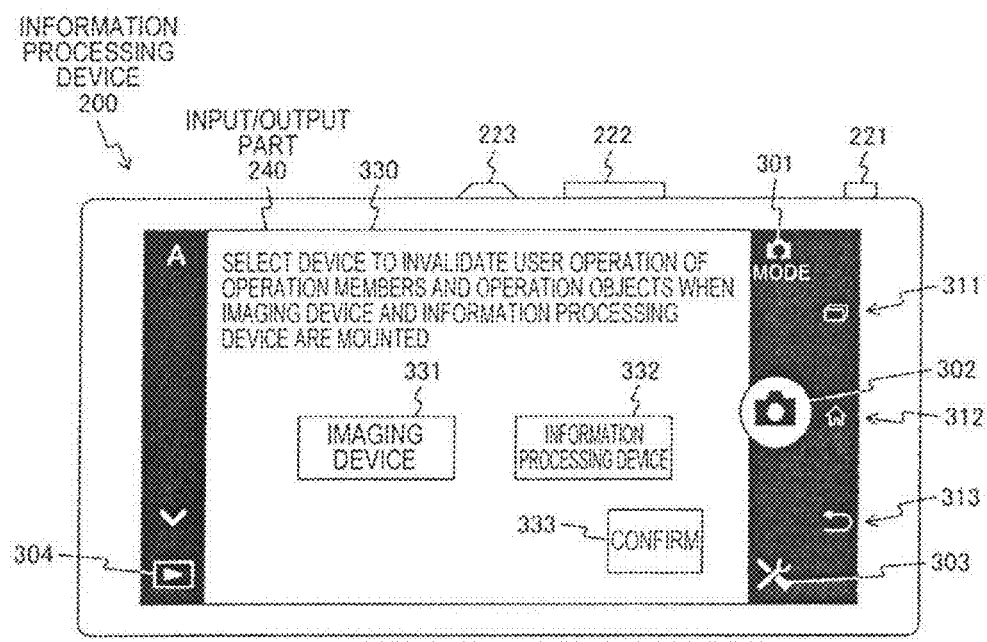

[Fig. 13]
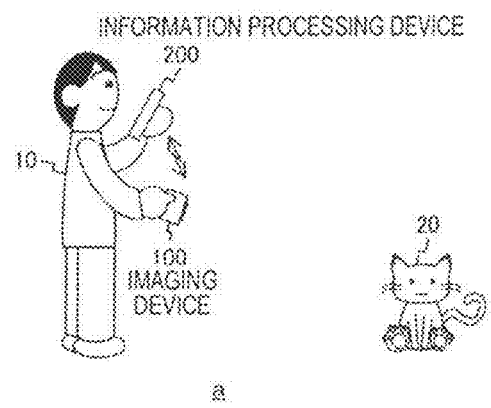
a
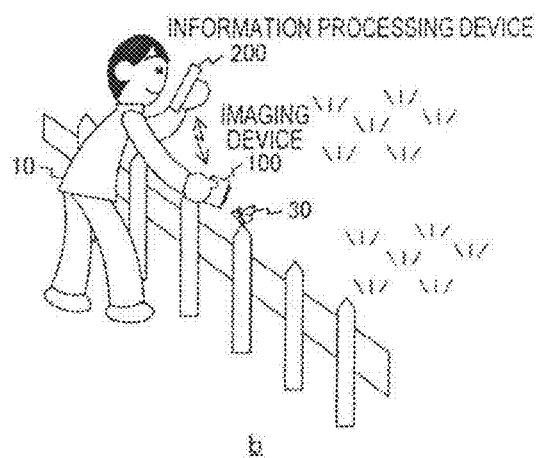
b
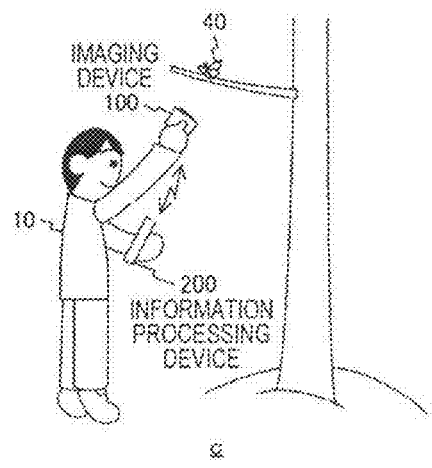
c

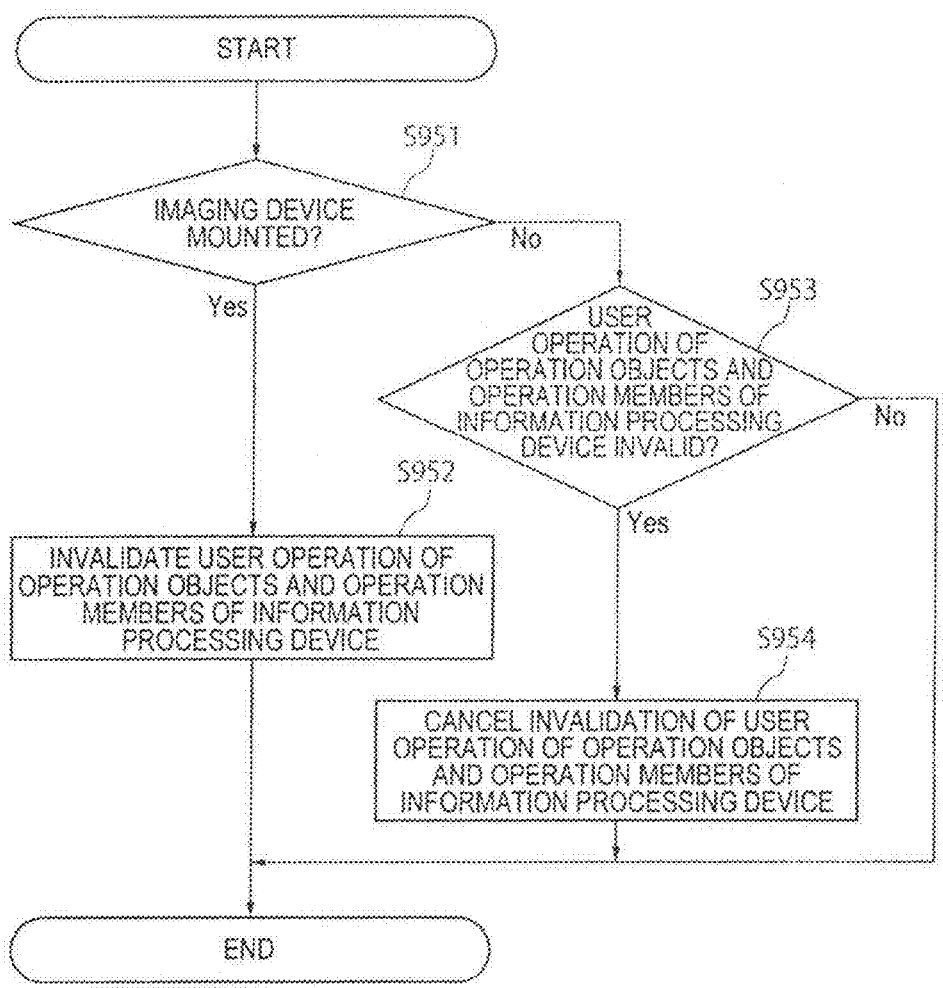

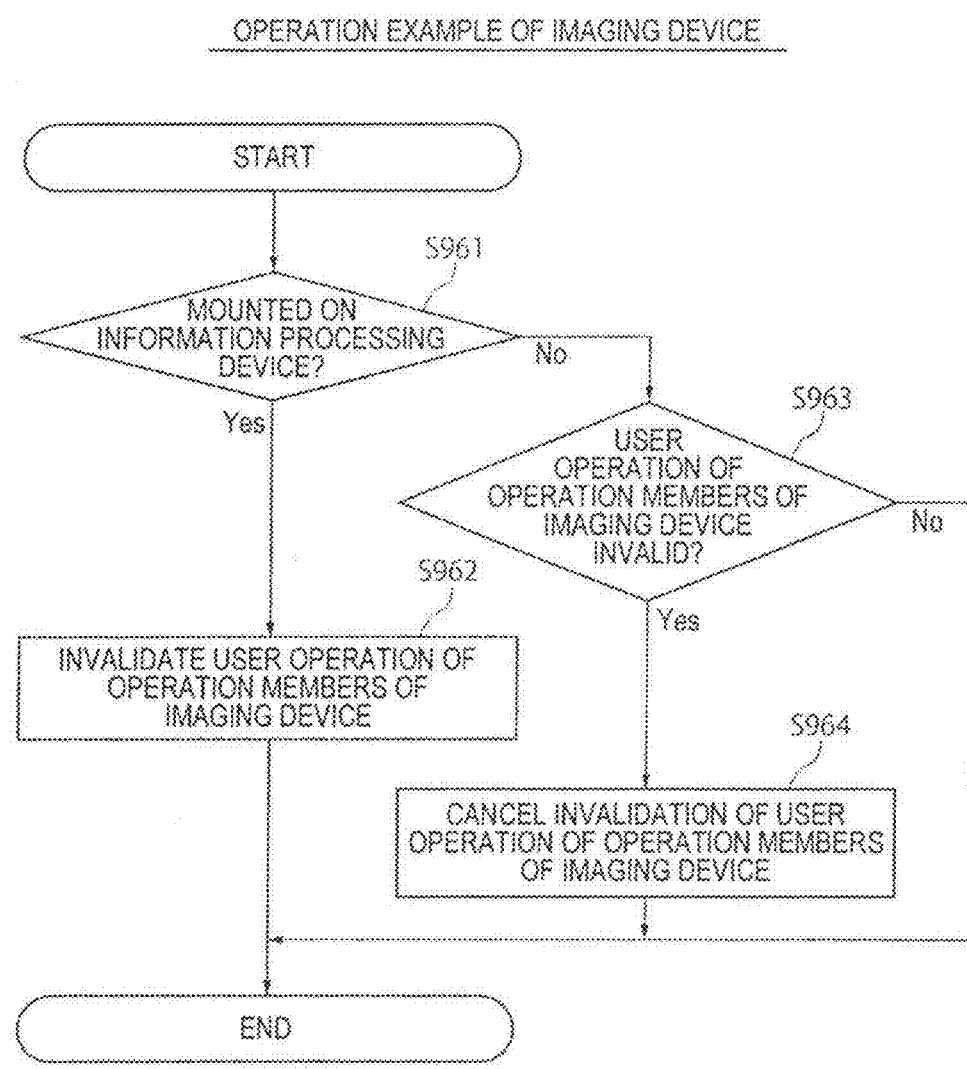

INFORMATION PROCESSING TO PREVENT OPERATION MALFUNCTION IN USAGE OF DEVICE

CROSS REFERENCE TO RELATED APPLICATIONS

This application claims the benefit of Japanese Priority Patent Application IP 2013-238402 filed Nov. 19, 2913, the entire contents of which are incorporated herein by reference.

TECHNICAL FIELD

The present technology relates to an information processing device and an imaging device. In detail, the present technology relates to the information processing device, an imaging device, an imaging system and an information processing method to perform processing based on a user operation, and a program that makes a computer execute the method.

BACKGROUND ART

An imaging device such as a digital still camera or a digital video camera (for instance, a camera integrated type recorder) that images an object, generates an image (image data) and records the image-as contents has been widely spread. Also, there exists a wireless communication technology of exchanging various kinds of data utilizing wireless communication.

Also, there exists a technology of operating an imaging device by another device utilizing wireless communication. For instance, there is proposed an electronic device that, when a contact operation to an operation switch image displayed at a display part is detected, makes an imaging device execute an operation corresponding to the operation switch image on which the contact operation has been performed (for instance, see PTL 1).

CITATION LIST

Patent Literature

[PTL 1]
JP 2009-94591A

SUMMARY

Technical Problem

In the above-mentioned related art, since the imaging device is operated fey the electronic device utilizing the wireless communication, for instance, even when the imaging device and the electronic device are at a distance, the imaging device is operated using the electronic device.

Here, for instance, assume that an imaging operation is to be performed with an imaging device attached to an information processing device capable of operating the imaging device using wireless communication. For instance, when an operation member of the information processing device is used for the operation, since it is different from usual operations of the information processing device, there is a risk of accidentally touching an operation member (for instance, another operation member of the information processing device or an operation member of the imaging device) different from the operation member intended by a user. Also, even in the case of separating the imaging device and the information processing device and perforating the imaging operation, since it is different from the usual operations of the information processing device or the imaging device, there is a risk of accidentally touching an operation member different from the operation member intended by the user. When such an erroneous operation occurs, there is a risk that a function corresponding to the accidentally touched operation member is activated and the individual devices start an operation not intended by the user. Therefore, it is important to prevent a malfunction not intended by the user.

The present technology is created in consideration of such a situation, and it is desirable to prevent a malfunction when using individual devices.

Solution to Problem

According to one aspect of the present technology, there is presented an information acquiring device comprising: an information acquiring control circuit configured to prevent an operation of the information processing device and/or an information acquiring device based on the presence of a connection between the information acquiring device and the information processing device.

According to another aspect of the present technology, there is presented an information processing device comprising: an information processing control circuit configured to prevent an operation of the information processing device and/or an information acquiring device based on the presence of a connection between the information acquiring device and the information processing device.

According to yet another aspect of the present technology, there is presented a non-transitory computer readable medium containing thereon instructions which, when executed, cause one or more processors to perform: preventing an operation of an information processing device and/or an information acquiring device based on the presence of a connection between the information acquiring device and the information processing device.

In each of the above aspects of the present technology, it may be further presented wherein the information acquiring device is an imaging device.

Additionally, in each of the above aspects of the present technology, it may be further presented wherein the information processing device is a portable communication device.

Additionally, in each of the above aspects of the present technology, it may be further presented wherein the connection is a physical attachment between the information acquiring device to the information processing device.

Additionally, in each of the above aspects of the present technology, it may be further presented wherein the connection is a communication link between the information acquiring device and the information processing device.

Additionally, in each of the above aspects of the present technology, it may be further presented wherein the communication link is one of a near field communication, a wireless local area network, Bluetooth, an infrared communication, portable radio waves, and combinations thereof.

Additionally, in each of the above aspects of the present technology, it may be farther presented wherein the information acquiring control circuit is configured to prevent an operation of at least one of an input part, an output part, an operation member, and combinations thereof.

Additionally, in each of the above aspects of the present technology, it may be further presented wherein the information acquiring control circuit is configured to stop preventing the operation of the information processing device and/or the information acquiring device based on the absence of the connection between the information acquiring device and the information processing device.

Additionally, in each of the above aspects of the present technology, it may be further presented wherein the information acquiring control circuit is configured to stop preventing the operation of the information processing device and/or the information acquiring device based on a user command to the information processing device and/or the information acquiring device.

Advantageous Effects of Invention

According to the present technology, an excellent effect of preventing a malfunction when using individual devices can be demonstrated. The effect described here is not necessarily limited and may be any effect described in the present disclosure.

BRIEF DESCRIPTION OF DRAWINGS

FIG. 1 is a diagram illustrating an appearance configuration of as imaging device 100 in a first embodiment of the present technology.

FIG. 2 is a diagram illustrating an appearance configuration when attaching the imaging device 100 to an information processing device 200 in the first embodiment of the present technology.

FIG. 3 is a block diagram illustrating a functional configuration example of the imaging device 100 and the information processing device 200 in the first embodiment of the present technology.

FIG. 4 is a diagram illustrating an appearance configuration example of an information processing device 200 in a first embodiment of the present technology.

FIG. 5 is a diagram illustrating a use example of the imaging device 100 and the information processing device 200 in the first embodiment of the present technology.

FIG. 6 is a flowchart illustrating one example of a processing procedure of invalidation processing by the information processing device 200 in the first embodiment of the present technology.

FIG. 7 is a flowchart illustrating one example of a processing procedure of invalidation processing by the information processing device 200 in the first embodiment of the present technology.

FIG. 8 is a diagram illustrating a display example of a display screen displayed at an input/output pan 240 in the first embodiment of the present technology.

FIG. 9 is a flowchart illustrating one example of a processing procedure of invalidation processing by fee information processing device 200 in the first embodiment of the present technology.

FIG. 10 is a flowchart illustrating one example of a processing procedure of invalidation processing by the imaging device 100 in a second embodiment of the present technology.

FIG. 11 is a flowchart illustrating one example of a processing procedure of invalidation processing by the information processing device 200 in the second embodiment of the present technology.

FIG. 12 is a diagram illustrating a display example of a display screen displayed at the input/output part 240 in the second embodiment of the present technology.

FIG. 13 is a diagram illustrating a use example of the imaging device 100 and the information processing device 200 in the third embodiment of the present technology.

FIG. 14 is a flowchart illustrating one example of a processing procedure of invalidation processing by the information processing device 200 in the third embodiment of the present technology.

FIG. 15 is a flowchart illustrating one example of a processing procedure of invalidation processing by the imaging device 100 in a third embodiment of the present technology.

DESCRIPTION OF EMBODIMENTS

Hereinafter, a form for implementing the present technology (hereinafter, called an embodiment) will be described. Descriptions will be given in the following order.
1. First embodiment (an example of invalidating a user operation of specific operation objects and specific operation members of an information processing device)
2. Second embodiment (an example of invalidating a user operation of operation objects and operation members of either one when the imaging device and the information processing device are mounted)
3. Third embodiment (an example of invalidating a user operation of either one of the devices when the imaging device and the information processing device are separated).

<1. First Embodiment>

{Appearance Configuration Example of imaging Device}

FIG. 1 is a diagram illustrating an appearance configuration of an imaging device 100 in the first embodiment of the present technology. A front view of the imaging device 100 is illustrated in FIG. 1a and a side view (a side view in the case of view from an arrow A) of the imaging device 100 is illustrated in FIG. 1b.

Also, in the embodiment or the present technology, an example is illustrated in which the imaging device 100 is a cylindrical (columnar) imaging device (for instance, a lens style camera). That is an example is illustrated in which the shape of the imaging device 100 is a shape of a lens pan alone taken out of a general imaging device (for instance, an incorporated type camera). Also, the imaging device 100 is for instance, embodied by a digital still camera or a digital video camera (for instance, a camera incorporated type recorder).

The imaging device 100 includes operation members 161-163, a display part 170, a lens barrel 180, and attachment members 191 and 192.

The lens barrel 180 houses individual members of an optical system and an imaging system or the like.

The operation members 161-163 are the operation members used when performing various kinds of operation input. For instance, the operation member 161 is the operation member (a shutter button (a shutter key)) used when performing a shutter operation (an operation for recording an image (image data) generated by an imaging part 110 (illustrated in FIG. 3) as image contents) of the imaging device 100. Also, the operation member 162 is the operation member (a zoom lever) used when performing a zoom operation of the imaging device 100. The operation member 163 is the operation member (a power button) used when performing ON/OFF operations of a power source of the imaging device 100.

The display part 170 (illustrated in FIG. 3) displays various kinds of information. For instance, at the display part 170, individual pieces of information (for instance, information for confirming presence/absence of a recording medium, information for confirming a battery residual amount) related to the imaging device 100 are displayed. The display part 170 is provided on a side surface opposite to the side of the operation members 161 and 163.

The attachment members 191 and 192 are attachments used when attaching the imaging device 100 to another device (for instance, an information processing device 200 illustrated in FIG. 2). For instance, by moving the attachment member 191 in a direction of an arrow 193 and moving the attachment member 192 in a direction of an arrow 194 corresponding to a shape and a size of another device, the imaging device 100 can be attached to the device. That is, the attachment members 191 and 192 are attachments tor fixing the imaging device 100 to another device. Also, an attachment surface in the case of attaching the imaging device 100 to another device is illustrated as a mounting surface 195 (a surface on the opposite side of a surface on a lens side illustrated in FIG. 1a). Also, an example of the case of attaching the imaging device 100 to another device is illustrated in FIG. 2.

Also, the attachment members 191 and 192 may be fixed to the imaging device 100 and provided, or may be detachable from the imaging device 100.

In this way, the imaging device 100 can, for instance, perform a normal imaging operation and be attached to another device (for instance, a smartphone) and used. Also, in the case of being attached to another device and used, the imaging device 100 can be operated by remote control using another device.

{Attachment Example of Imaging Device}

FIG. 2 is a diagram illustrating an appearance configuration in the case of attaching the imaging device 100 to the information processing device 200 in the first embodiment of the present technology.

An example of the case of attaching the imaging device 100 to one surface (a surface provided with an imaging part 292) of the information processing device 200 is illustrated in FIG. 2a and FIG. 2b. In FIG. 2a, a front view in the case of attaching the imaging device 100 to the information processing device 200 is illustrated. Also, in FIG. 2b, a perspective view in the case of attaching the imaging device 100 to the information processing device 200 is illustrated.

The information processing device 200 includes operation members 221-223, an input/output part 240 (illustrated in FIG. 3 and FIG. 4), a sound output part 280, a light emitting part 291, and the imaging part 292. Also, the information processing device 200 is embodied by an information processing device such as a smartphone, a tablet terminal, a content output device or a game device, for instance.

The operation members 221-223 are the operation members used when performing various kinds of operation input. For instance, the operation member 221 is the operation member (the shutter button (the shutter key)) used when performing a shutter operation (an operation for recording an image (image data) generated by the imaging part 292 as image contents) of the information processing device 200. Also, the operation member 222 is the operation member (a sound volume adjustment button (a sound volume bar)) used when performing an operation for adjusting a sound volume output from the sound output part 280. The operation member 223 is the operation member (the power button) used when performing ON/OFF operations of a power scarce of the information processing device 200.

The input/output part 240 displays various kinds of images, and receives the operation input from a user on the basis of the detected state of an object which is adjacent to or in contact with a display surface of the input/output part 240.

The sound output part 280 outputs various kinds of sound information.

The light emitting part 201 is a light emitting device which emits light to an object. The light emitting part 211 is used when permitting an imaging operation using the information processing device 200 in an environment where it is difficult to expect sufficient brightness such as the nighttime or indoor, for instance.

The imaging past 292 images an object and generates an image (image date).

As illustrated in FIG. 2, by the attachment members 191 and 192 of the imaging device 100 holding a main body of the information processing device 200 between them, the imaging device 100 can be fixed to the information processing device 200. Also, the imaging device 100 may be attached to another past (a part other than the part illustrated in FIG. 2) in the information processing device 200.

{Functional Configuration Example of Imaging Device and Information Processing Device}

FIG. 3 is a block diagram illustrating a functional configuration example of the imaging device 100 and the information processing device 200 in the first embodiment of the present technology. Also, an imaging system constituted of the imaging device 100 and the information processing device 200 is one example of an imaging system described in the scope of claims.

{Functional Configuration Example of Imaging Device}

The imaging device 100 includes the imaging part 110, an image processing part 120, a storage part 130, a control part 140, a wireless communication part 150, an operation reception part 160, and the display part 170.

The imaging part 110 images an object and generates an image (image data) on the basis of control of the control part 140, and outputs the generated image to the image processing part 120. The imaging part 110 is, for instance, constituted of an optical system (a plurality of lenses) and an imaging element. Also, individual parts (for instance, a zoom lens, a focus lens, a diaphragm) of the imaging part 110 are controlled under the control of the control part 140. In the embodiment of the present technology, it is assumed that a reference to "image" includes senses of both image itself and image data for displaying the image.

The image processing part 120 executes predetermined image processing (for instance, demosaic processing) for the image output from the imaging part 110 under the control of the control part 140, and the image subjected to the image processing is stored in the storage part 130. The image subjected to the image processing by the image processing part 120 may be transmitted to the information processing device 200 utilizing wireless communication and stored in a storage part 270.

The storage part 130 is a recording medium that stores the image subjected to the image processing by the image processing part 120 as contents (for instance, a still image file, a moving image file). The storage part 130 may be built in the imaging device 100 or maybe attachable and detachable to/from the imaging device 100.

The control part 140 controls the individual parts in the imaging device 100 on the basis of a control program. For instance, the control part 140 controls the individual parts on the basis of the operation input received by foe operation members such as the zoom lever (the operation member 162) or the shutter button (the operation member 161) provided in the imaging device 100. Also, the control part 140 controls the individual parts on the basis of central information from the information processing device 200 received through the wireless communication part 150. That is, the imaging device 100 can be remotely controlled using the information processing device 200.

Also, for instance, when the information processing device 200 and the imaging device 100 are connected using the wireless communication, the control part 140 executes the control of invalidating the user operation of at least one of the individual operation members provided in each of the individual devices.

The wireless communication part 150 transmits and receives individual pieces of information (for instance, control data, image data) to/from another information processing device (for instance, the information processing device 200) utilizing the wireless communication under the control of the control part 140.

Here, as the wireless communication, for instance, near field communication (NFC) or a wireless local area network (LAN) may be used. As the wireless LAN, for instance, wireless fidelity (Wi-Fi) (registered trademark) may be used. Also, as the wireless communication, for instance, the wireless communication of Bluetooth (registered trademark), infrared rays, and portable radio waves or the like may be used.

Also, a plurality of wireless communication systems may be used. For instance, at the start of the wireless communication, only a power source is turned on and data (for instance, a service set identifier (SSID)) related to the Wi-Fi is exchanged by the NFC. Then, data is exchanged thereafter through the Wi-Fi.

Also, for instance, when detecting attachment of the imaging device 100 to the information processing device 200, exchange of data by the NFC may be used. Also, the image data and the control data can be exchanged between the imaging device 100 and the information processing device 200 utilizing the Wi-Fi.

The operation reception part 160 is the operation reception part that receives an operation performed by the user, and outputs control information (operation information) according to received operation contents to the control part 140. The operation reception part 160 corresponds to, for instance, the operation members 161-163 illustrated in FIG. 1.

The display part 170 displays various kinds of information. In the embodiment of the present technology an example is illustrated in which the image (a live-view image) generated by the imaging part 110 is not displayed at the imaging device 100 and is displayed at the information processing device 200. Therefore, the display part 170 is a relatively small display panel or the like and is capable of performing simple display (for instance, battery residual amount and notification display) only.

{Functional Configuration Example of Information Processing Device}

The information processing device 200 includes a posture detection part 210, an operation reception part 220, a wireless communication part 230, the input/output part 240, a control part 250, an image processing part 260, the storage part 270, and the sound output part 280.

The posture detection part 210 detects change in a posture of the information processing device 200 by detecting an acceleration, movement and inclination or the like of the information processing device 200, and outputs posture information related to the detected change in the posture to the control part 250. As the posture detection part 210, for instance, various kinds of sensors such as a gyro sensor or an acceleration sensor may be used.

The operation reception past 220 is the operation reception part that receives the operation performed by the user, and outputs the control information (operation information) according to the received operation contents to the control part 250. The operation reception part 220 corresponds to, for instance, the operation members 221-223 illustrated in FIG. 2.

The wireless communication pan 230 transmits and receives individual pieces of information (for instance, the control data, the image data) to/from another information processing device (for instance, the imaging device 100) utilizing the wireless communication under the control of the control part 250. As the wireless communication, for instance, the above described wireless LAN (for instance, the Wi-Fi), the NFC, Bluetooth, infrared rays or portable radio waves or the like may be used. Also, the plurality of wireless communication systems may be used.

For the input/output part 240, an input pan 241 and a display part 242 are configured as one body. Also, the input/output part 230 displays various kinds of images on the display part 242 under the control of the control part 250, and recedes the operation input from the user by the input part 241 on the basis of the detected state of an object which is adjacent to or in contact with a display surface of the display part 242. The input pan 241 outputs the control information according to the received operation input to the control part 250.

For instance, as the input part 241, there may be used an electrostatic type (electrostatic capacity type) touch panel that detects contact or approach of a conductive object (for instance, a finger of a person) on the basis of change in electrostatic capacity. Also, for instance, as the display part 242, these may be used & display panel such as a liquid crystal display (LCD) or an organic electro luminescence (EL) panel. Then, the input/output part 240 is configured by superimposing a transparent touch panel on the display surface of the display panel, for instance.

For instance, the user can operate the information processing device 200 and the imaging device 100 by performing a contact operation (or an adjacent operation) of an operation object or the like displayed at the display part 242. Here, the operation object is displayed at the input/output part 240 like operation objects 301-307, 311-313, illustrated in FIG. 4, for instance. That is, the operation objects are each an operation button (a graphical user interface (QUI) button) or the like for performing the operation input.

The control part 250 controls the individual parts in the information processing device 200 on the basis of a control program. For instance, the control part 250 determines the posture of the information processing device 200 on the basis of the posture information from the posture detection part 210, and switches a display form of the display screen to be displayed at the input/output part 240 based on the determination result. For instance, the control part 250 determines a vertical direction of the posture of the information processing device 200 on the basis of the posture information from the posture detection part 210, and switches the vertical direction of the display screen to be displayed at the input/output part 240 on the basis of the determination result. Also, for instance, when the information processing device 200 and the imaging device 100 are connected through the wireless communication part 230, the control part 250 makes the display screen that displays various kinds of information related to the imaging device 100 be displayed at the input output part 240. Also, for instance, when performing the imaging operation using the imaging device 100, the control part 250 makes the input/output part 240 display the operation object (for instance, the operation objects 301-307 illustrated in FIG. 4) that receives the user-operation related to the imaging operation.

Also, for instance, when the information processing device 200 and the imaging device 100 are connected using the wireless communication, the control part 250 executes the control of invalidating the user operation of at least one of the individual operation members provided in each of the individual devices. For instance, when performing the imaging operation using the imaging device 100, the control part 250 executes the control of invalidating the user operation of the operation members used also for operations other than the imaging operation among the individual operation members provided in the information processing device 200. Also, for instance, when the imaging device 100 is mounted on the information processing device 200, the control part 250 executes the control of invalidating the user operation of the operation members used also for operations other than the imaging operation among the individual operation members presided in the information processing device 200. Here the operation members used also for operations other than the imaging operation are, for instance, operation members 221-221 illustrated in FIG. 2a and FIG. 2b.

Also, for instance, the control part 250 executes the control of invalidating the user operation of at least one of the operation objects (for instance, operation objects 301-307, 311-313 illustrated in FIG. 4) that are displayed at the input/output part 240 and receive the user operation. For instance, the control part 250 executes the control of invalidating the user operation of the operation objects (for instance, the operation objects 311-313 illustrated in FIG. 4) used also for operations other than the imaging operation among the operation objects displayed it the input/output part 240.

The image processing part 260 executes predetermined image processing for the image generated by the imaging device 100 and the image generated by the imaging part 292 (illustrated in FIG. 2a and FIG. 2b) under the control of the control part 250, and makes the display part 242 display the image subjected to the image processing. Also, the image processing part 260 stores the images in the storage part 270 under the control of the control part 250. Also, the image processing part 260 makes the display part 242 display the display screen to be used when the imaging operation using the imaging device 100 is being performed, under the control of the control part 250.

The storage part 270 is a recording medium that stores individual pieces of information under the control of the control past 250. For instance, in the storage part 270, the image generated by the imaging device 100 and the image generated by the imaging part 292 (illustrated in FIG. 2a and FIG. 2b) are stored as contents (for instance, the still image file, the moving image file). The storage part 270 may be built in the information processing device 200 or may be attachable and detachable to/from the information processing device 200.

The sound output part 280 outputs sound information under the control of the control part 250. The sound output part 280 can be embodied by a speaker, for instance.

{Example of Operation Member and Operation Object of Information Processing Device}

FIG. 4 is a diagram illustrating an appearance configuration example of the information processing device 200 in the first embodiment of the present technology. FIG. 4 illustrates a surface (the surface provided with the input/output part 240) on the opposite side of a surface illustrated in FIG. 2a.

As described above, the information processing device 200 includes the operation members 221-223 and the input/output part 240.

Also, when the imaging device 100 is connected using the wireless communication and an application (specific application) for performing the imaging operation using the imaging device 100 is activated, a display screen illustrated in FIG. 4 is displayed at the input/output part 240. That is, when the imaging operation using the imaging device 100 and the information processing device 200 is being performed, the display screen illustrated in FIG. 4 is displayed at the input/output part 240. In this case, at the input/output part 240, an image generated by the imaging part 110 of the imaging device 100 is displayed as a live-view image. That is, the image generated by the imaging part 110 of the imaging device 100 is successively transmitted to the information processing device 200 through wireless communication parts 150 and 230, and the image is displayed at the input/output part 240 as a live-view image 300. Also, the image data and the control data are exchanged between the imaging device 100 and the information processing device 200 by using the Wi-Fi, for instance. FIG. 4 illustrates an example of displaying the image in which a mountain and a dog walking in front of it am objects as the live-view image 300.

Also, in FIG. 4, an example of displaying the operation object for operating the imaging device 100 at the input/output part 240 when the imaging operation using the imaging device 100 and the information processing device 200 is being performed is illustrated. The operation object is displayed at the input/output part 240 around the live-view image, or on the live-view image, for instance.

Also, in FIG. 4, an example of displaying the live-view image 300, displaying the plurality of operation objects 301-304 on both sides of the live-view image 300, and displaying the plurality of operation objects 305-307 on the live-view image 300 is illustrated.

The operation object 301 is the operation object to be pressed when switching an imaging mode of the imaging device 100. Also, the operation object 302 is the operation object to be pressed when performing a shutter operation of the imaging device 100. The operation object 303 is the operation object to be pressed when performing various kinds of setting operations of the imaging device 100. The operation object 304 is the operation object to be pressed when reproducing the image. Also, the operation objects 305 and 306 are the operation objects for displaying the various kinds of setting information of the imaging device 100 and changing individual settings. Also, the operation object 307 is the operation object for performing the zoom operation of the imaging device 100. For instance, a W (wide) button (a wide side button) and a T (tele) button (tele side button) are displayed as the operation object 307. For instance, when the user operation is performed for the W button or the T button, the control part 250 acquires the control information according to the user operation, and transmits the control information to the control part 140 of the imaging device 100 through the wireless communication part 230 and 150. In the case of receiving the control information, the control part 140 of the imaging device 100 controls drive of the zoom lens of the imaging part 110 on the basis of the received control information.

Also, at the input/output part 240, the operation objects 311-313 to be used in the individual operations (for instance, a telephone call operation, a communication operation, the imaging operation) in the information processing device 200 are displayed. The operation objects 311-313 are used also for the individual operations other than the imaging operation. In FIG. 4, the operation objects 311-313 are enclosed by a dotted-line rectangle 310 and indicated. Also, the operation objects 311-313 can be recognized as native user interlace (UI) buttons.

The operation object 311 is the operation object (setting button) to be pressed when displaying various kinds of setting items (for instance, a menu item). That is, no master what screen is displayed at the input/output part 240, by pressing the operation object 311, various kinds of setting items can he displayed.

The operation object 312 is the operation object (home button) to be pressed when displaying a home screen. That is, no matter what screen is displayed at the input/output part 240, by pressing the operation object 312, the home screen can be displayed.

The operation object 313 is the operation object (return button) to be pressed when returning to a screen immediately before. That is, by pressing the operation object 312, the screen displayed at the input/output part 240 immediately before can be displayed.

{Use Example of Imaging Device and Information Processing Device}

FIG. 5 is a diagram illustrating a use example of the imaging device 100 and the information processing device 200 in the first embodiment of the present technology.

In FIG. 5a, one example of the case of attaching the imaging device 100 to the information processing device 200 and using the imaging device 100 is illustrated. For instance, as illustrated in FIG. 2a and FIG. 2b, the imaging device 100 can be attached to one surface (a surface on the opposite side of a surface provided with the input/output part 240) of the information processing device 200. In this case, a user 10 can perform imaging almost similarly to imaging using a general imaging device (for instance, the incorporated type camera), by using the information processing device 200 to which the imaging device 100 is attached.

In FIG. 5b, one example of the case of using the imaging device 100 without attaching the imaging device 100 to the information processing device 200 is illustrated. For instance, as illustrated in FIG. 5b, the imaging device 100 can be installed at a location away from the information processing device 200. Even in this case, since the user 10 can remotely control the imaging device 100 using the information processing device 200, imaging using the imaging device 100 and the information processing device 200 can be performed.

Here, for instance, when the imaging device 100 is attached to the information processing device 200 and used, as illustrated in FIG. 5a, there is a possibility of occurrence of an erroneous operation by the individual operation members provided in the information processing device 200 or the individual operation members provided in the imaging device 100.

For instance, it is assumed that, when performing a shutter operation by pressing the operation object 302 displayed at the input/output part 240 of the information processing device 200, the user accidentally touches the other operation object (for instance, the operation object 313). When the operation object 313 is accidentally touched in such a manner, the application (specific application) for performing the imaging operation using the imaging device 100 is ended. In this case, since it is necessary that the application (specific application) be activated again, an operation for reactivation becomes troublesome. Also, since it takes time before the reactivation, there is a risk of missing a timing of photographing.

In this way, when perforating the operation using the operation object displayed at the input/output part 240 of the information processing device 200, it is assumed that the other operation object is accidentally touched.

Also, for instance, it is assumed that, when performing the shutter operation by pressing the operation object 302 displayed at the input/output part 240 of the information processing device 200, the user touches an operation member 162 (zoom lever) of the imaging device 100. When the operation member 162 (zoom lever) is accidentally touched in such a manner, a view angle is changed and turned to the view angle different from the view angle intended by the user. In this case, in order to attain the view angle intended by the user, it is necessary that a zoom operation be performed again so that the zoom operation becomes troublesome. Also, since the time of performing the zoom operation again may be necessary, there is a risk of missing the timing of photographing.

In this way, when performing the operation using the operation object displayed at the input/output part 240 of the information processing device 200, it is assumed that the operation member of the imaging device 100 is accidentally touched.

Also, when performing the operation using the operation member of the imaging device 100, it is assumed that the operation member of the information processing device 200 is accidentally touched.

Also, when performing the operation using the operation object related to the imaging operation displayed at the input/output part 240 of the information processing device 200, it is assumed that the other operation object (the native UI button) is accidentally touched.

In this way, these is the risk of the occurrence of the erroneous operation by the respective operation members (for instance, the input/output part 240, the operation members 221-223) provided in the information processing device 200 and the operation members 161-163 (for instance, the shutter key, the zoom lever, the power button) provided in the imaging device 100. When such an erroneous operation occurs, there is a risk that a function corresponding to the accidentally touched, operation member is activated and the individual devices start the operation not intended by the user. Then, it is important to prevent the malfunction not intended by the user.

Accordingly, in the embodiment of the present technology, an example of preventing the malfunction when using the imaging device 100 and the information processing device 200 (when performing the imaging operation) is illustrated.

Also, in the embodiment of the present technology, the invalidation of the user operation of the operation member includes meanings of not receiving the user operation of the operation member, invalidating the reception of the operation member, and not receiving the operation member or the like. Similarly, the invalidation of the user operation of the operation object includes meanings of not receiving the user operation of the operation object, invalidating the reception of the operation object, not receiving the operation object, and not displaying the operation object or the like.

{Example of Determining Connection Relation between Imaging Device and Information Processing Device}

Here, a method of determining connection relation between the imaging device 100 and the information processing device 200 will be described.

{Example of Estimating Distance Using Reception Radio Field Intensity}

For instance, a distance between the imaging device 100 and the information processing device 200 can be estimated using reception radio field intensity. For instance, a table indicating relationship between the reception radio field intensity and the distance is prepared, and stored in the storage part 270. Then, the control part 250 of the information processing device 200 acquires the distance corresponding to the reception radio field intensity acquired by the wireless communication part 230 from the table, and can use the distance as the distance between the imaging device 100 and the information processing device 200. Also, when the distance acquired from the table is shorter than a threshold (for instance, 1 to 10 cm), the control part 250 of the information processing device 200 can determine that the imaging device 100 is attached to the information processing device 200.

{Example of Using Member for Detecting Engagement}

For instance, engagement of the imaging device 100 cart be detected using a member for detecting that the imaging device 100 is mounted on the information processing device 200. As the member, for instance, a switch can be provided on at least one of the imaging device 100 and the information processing device 200.

For instance, the case of providing the switch on the imaging device 100 is assumed. In this case, when the imaging device 100 is mounted on the information processing device 200, the engagement is detected by the switch, and information indicating that the engagement is detected is output to the control part 140. Then, when the information indicating that the engagement is detected is acquired, the control part 140 transmits that effect to the information processing device 200 through the wireless communication part 150. Thus, the control part 250 of the information processing device 200 can detect that the imaging device 300 is mounted on the information processing device 200. Also, the control part 140 of the imaging device 100 can detect that the imaging device 100 is mounted on the information processing device 200.

Also, for instance, the case of providing the switch on the information processing device 200 is assumed. In this case, when the imaging device 100 is mounted on the information processing device 200, the engagement is detected by the switch, and the information indicating that the engagement is detected is put to the control part 250. Then, when the information indicating that the engagement is detected is acquired, the control past 250 transmits that effect to the imaging device 100 through the wireless communication part 230. Thus, the control part 250 of the information processing device 200 can detect that the imaging device 100 is mounted on the information processing device 200. Also, the control part 140 of foe imaging device 100 can detect that the imaging device 100 is mounted on the information processing device 200.

Also, the distance between the imaging device 100 and the information processing device 200 may be detected using another sensor. For instance, a distance sensor (for instance, a sensor which detects the distance using infrared rays or ultrasonic waves) may be used. Also, for instance, the distance between the imaging device 100 and the information processing device 200 may be detected using a global positioning system (GPS). For instance, respective positions of the imaging device 100 and the information processing device 200 are acquired using the GPS, and the distance between the imaging device 100 and the information processing device 200 can be calculated on the basis of these positions. Also, when the calculated distance is shorter than the threshold (for instance, 1 to 10 cm), the control part 250 of the information processing device 200 can determine that the imaging device 100 is attached to the information processing device 200.

{Example of Detecting Engagement of Imaging Device Using Short-Range Wireless Communication}

For instance, engagement of the imaging device 100 with the information processing device 200 can be detected using short-range, wireless communication. Here, an example of using near field communication (NFC) as the short-range wireless communication is illustrated.

For instance, in the NFC, periodical communication is performed between the devices. For instance, a polling command is issued periodically from the information processing device 200. The polling command is a command for discriminating an NFC tag determined by an NFC standard (for instance, see NFC Forum Type3 Tag Operation Specification NFC Forum-TS-Type-3-Tag_1.1).

For instance, when there is a response (polling response) to the periodically issued polling command, the information processing device 200 can determine that an adjacent device exists. Here, a distance at which data communication utilizing the NFC is possible is about 1 to 10 cm. Accordingly; when there is the polling response, the control part 250 of the information processing device 200 can determine that the imaging device 100 is attached to the information processing device 200.

Also, when there is no response (polling response) to the polling command, the information processing device 200 can determine that an adjacent device does not exist. In this case, the control part 250 of the information processing device 200 can determine that the imaging device 100 is not attached to the information processing device 200.

Here, the NFC is widely spread. Also, the NFC is often loaded on an information processing device such as a smartphone. Therefore, in the case of the information processing device loaded with the NFC, by detecting the attachment using the NFC, hardware may not necessarily be newly provided tor performing the detection. Thus, a manufacturing cost of the information processing device can be reduced.

Here for instance, it is also assumed that the imaging device is not mounted on the information, processing device and the imaging device and the information processing device are adjacent. In such a case, when engagement is detected using the short-range wireless communication other than the NFC, there is a risk of erroneous detection that the imaging device is mounted. Then, in the embodiment of the present technology, the NFC is used as the short-range wireless communication. Thus, accuracy of detecting engagement of the imaging device can be improved.

{Example of Detecting Engagement of Imaging Device Using Check Command and Check Response}

The example of detecting engagement of the imaging device using the NFC is illustrated above. When detecting engagement of the imaging device using the NFC in this way, engagement of the imaging device may fee detected using a check command and a check response.

For instance, the check command and the check response are exchanged, and when specifying information is included in the check response, it can be determined that the imaging device 100 is attached to the information processing device 200. Here, the specifying information is information (identification information) for specifying the imaging device 100. Also, the check command and the check response are commands for reading contents of an NFC tag. The command is defined in NFC Forum Type3 Tag Operation Specification.

For instance, as described above, the polling command is issued and a response (polling response) to the polling command is exchanged.

Then, when the polling response is received, the control part 250 of the information processing device 200 transmits the check command. When the cheek command is received, the control part 140 of the imaging device 100 transmits a response (check response) to the check command. In this case, the control part 140 of the imaging device 100 includes the specifying information (the information (identification information) for specifying foe imaging device 100) in the check response and transmits it.

For instance, information indicating "ABC DSC/Lens-Style Camera" can be included in the check response and transmitted as the specifying information. Here, for instance, it is assumed that "ABC" is information indicating a name of a company which manufactures the imaging device 100, and "DSC" is information indicating that it is the imaging device. Also, it is assumed that "Lens-Style Camera" is information indicating that it is a lens style camera.

In this way, the control part 140 of the imaging device 100 includes the specifying information in the check response and transmits it. Thus, the information processing device 200 which receives the check response can recognize that the device which has transmitted the check response is the imaging device 100 on the basis of the specifying information included in the check response. That is, it can be recognized that the device which has transmitted the check response is the lens style camera (the imaging device 100) made by the company "ABC".

When, the check response is received, the control part 250 of the information processing device 200 acquires contents of the check response. Subsequently, the control part 250 of the information processing device 200 determines whether or not the specifying information is included in the check response. Then, in the case that the specifying information is included in the check response, the control part 250 of the information processing device 200 determines that the imaging device 100 is attached to the information processing device 200. On the other hand, in the case that the specifying information is not included in the check response, the control part 250 of the information device 200 determines that the imaging device 100 is not attached to the information processing device 200.

In this example, the example that the information processing device 200 detects of detecting engagement of the imaging device 100 using the NFC is illustrated, however, it is similarly applicable to the case that the imaging device 100 detects engagement of the information processing device 200 using the NFC.

The above-described distance detection method and engagement detection method are examples, and other detection methods may be used without being limited to these methods. Also, engagement may be detected in one device and the detection result may be notified to the other device.

{Operation Example of Information Processing Device}

FIG. 6 is a flowchart illustrating one example of a processing procedure of invalidation processing by the information processing device 200 in the first embodiment of the present technology. FIG. 6 illustrates an example of using the Wi-Fi for exchanging data related to the imaging operation between the imaging device 100 and the information processing device 200. Also, FIG. 6 illustrates an example of invalidating the user operation of the specific operation objects and the specific operation members of the information processing device 200 when the imaging device 100 is connected by the Wi-Fi and the specific application is activated. Also, the specific application is, as described above, the application for performing the imaging operation using the imaging device 100.

First, the control part 250 determines whether or not the imaging device 100 is connected by the Wi-Fi and the specific application is activated (step S901).

When the imaging device 100 is connected by the Wi-Fi and the specific application is activated (step S901), the control part 250 executes the control of invalidating the user operation of the specific operation objects and the specific operation members of the information processing device 200 (step S902). For instance, the specific operation objects may be the operation objects 311-313 illustrated in FIG. 4 and the specific operation members may be the operation members 221-223 illustrated in FIG. 4. In this case, the control part 250 executes the control of invalidating the pressing operation of the operation objects 311-313 and the operation members 221-223 (step S902). In this case, for instance, the user may be notified of the fact that the user operation is invalidated (for instance, display at the input/output part 240, sound output from the sound output part 280). Also, step S902 is one example of a procedure of invalidating the user operation described in the scope of claims.

When the imaging device 100 is not connected by the Wi-Fi, or when the specific application is not activated (step S901), the control part 250 determines whether or not setting for invalidating the user operation is performed (step S903). That is, the control part 250 determines whether or not the setting for invalidating the user operation of the specific operation objects and the specific operation members of the information processing device 200 is performed (step S903). Then, when the setting for invalidating the user operation of the specific operation objects and the specific operation members of the information processing device 200 is not performed (step S903), the operation of the invalidation processing is ended.

When the setting for invalidating foe user operation of the specific operation objects and the specific operation members of the information processing device 200 is performed (step S903), the control of canceling the invalidation of the user operation of the specific operation objects and the specific operation members is executed (step S904). For instance, when the specific operation objects are the operation objects 311-313 and the specific operation members are the operation members 221-223, the control part 250 executes the control of canceling the invalidation of the pressing operation of the operation objects 311-313 and the operation members 221-223.

In this way, when the imaging device 100 is connected by the Wi-Fi and the specific application is activated, the user operation of the specific operation objects and the specific operation members of the information processing device 200 can be invalidated. Thus, even when the operation object related to the specific application and the other operation objects are adjacent, the erroneous operation can be prevented. Also, the erroneous operation of the specific operation members during the imaging operation can be prevented.

While the example of invalidating the user operation of the operation object is illustrated in the embodiment of the present technology, the user operation of the operation object may be invalidated by deleting the operation object (for instance, non-display, display of being inoperable).

{Operation Example of Information Processing Device}

FIG. 7 is a flowchart illustrating one example of the processing procedure of the invalidation processing by the information processing device 200 in the first embodiment of the present technology. FIG. 7 illustrates an example of invalidating the user operation of the specific operation objects and the specific operation members of the information processing device 200 when the imaging device 100 is mounted on the information processing device 200. Since steps S912, S913, and S914 correspond to steps S902, S903 and S904 illustrated in FIG. 6, detailed descriptions here are omitted.

First, the control part 250 determines whether or not the imaging device 100 is mounted (step S911). For the engagement detection method, the individual above-described methods can be used.

When the imaging device 100 is mounted (step S911), the control part 250 executes the control of invalidating the user operation of the specific operation objects and the specific operation members of the information processing device 200 (step S912). On the other hand, when the imaging device 100 is not mounted (step S911), the control part 250 determines whether or not the setting for invalidating the user operation of the specific operation objects and the specific operation members of the information processing device 200 is performed (step S913).

In FIG. 6 and FIG. 7, an example that the information processing device 200 determines whether or not a predetermined condition is satisfied and performs the invalidation processing on the basis of the determination result Is illustrated. However, the imaging device 100 may make the determination, transmit the determination result to the information processing device 200, and the information processing device 200 may perform the invalidation processing on the basis of the determination result. Or, the imaging device 100 may make the determination and perform the invalidation processing of the information processing device 200 based on the determination result. In this case, the imaging device 100 controls the invalidation of the information processing device 200 using the wireless communication.

That is, when performing the imaging operation using the imaging device 100, the control part 140 is capable of executing the control of invalidating the user operation of the operation members 221-223 used also for operations other than the imaging operation among the individual operation members provided in the information processing device 200. Also, when she imaging device 100 is mounted on fee information processing device 200, the control part 140 is capable of executing the control of invalidating the user operation of the operation members 221-223 used also for operations other than the imaging operation among the individual operation members provided in the information processing device 200.

Also, for instance, when performing the imaging operation using the imaging device, the control part 140 is capable of executing the control of making the input/output part 240 display the operation objects 301-307 that receive the user operation related to the imaging operation. Also, the control part 140 is capable of executing the control of invalidating the user operation of at least one of the operation objects that are displayed at the input-output part 240 provided in the information processing device 200 and receive the user operation. For instance, the control part 140 is capable of executing the control of invalidating the user operation of the operation objects 311-313 also used for operations other than the imaging operation among the operation objects displayed at the input/output part 240.

For instance, when the imaging device 100 is mounted on the information processing device 200, it is assumed that the information processing device 200 is turned to a horizontally long state to perform the imaging operation. When performing the imaging operation in such a photographing style, as illustrated in FIG. 4, the operation object related to the specific application and the other operation objects (specific operation objects) are adjacently displayed. Therefore, by invalidating the user operation of the specific operation objects of the information processing device 200, the erroneous operation of the specific operation objects can be prevented. Also, when performing the imaging operation in the photographing style of turning the information processing device 200 to the horizontally long state, since it is different from a usual using form, (for instance, a vertically long state) of the information processing device 200, it is assumed that the operation members 221-223 of the information processing device 200 are accidentally touched. Therefore, by invalidating the user operation of the specific operation members 221-223 of the information processing device 200, the erroneous operation of the specific operation members 221-223 can be prevented.

{Setting Example of Invalid Mode}

FIG. 8 is a diagram illustrating a display example of a display screen displayed at the input/output part 240 in the first embodiment of the present technology.

FIG. 8 illustrates one example of a display screen 320 for setting an invalid mode. Here, the invalid mode is a mode of invalidating the user operation of the specific operation objects and the specific operation members of the information processing device 200 when the imaging device 100 is connected by the Wi-Fi and the specific application is activated.

On the display screen 320, a button 321 for setting the invalid mode, a button 322 for not setting the invalid mode, and a confirmation button 323 are displayed.

The button 321 for setting the invalid mode is the button to be pressed in the case of setting the above-described invalid mode when the imaging device 100 is connected by the Wi-Fi and the specific application is activated.

The button 322 for not setting the invalid mode is the button to be pressed in the case of not setting the above-described invalid mode even when the imaging device 100 is connected by the Wi-Fi and the specific application is activated.

The confirmation button 323 is the button to be pressed in the case of establishing the pressing operation of the button 321 for setting the invalid mode and the button 322 for not setting the invalid mode.

When the invalid mode is set by the pressing operation of the button 321 for setting the invalid mode and the confirmation button 323, a display screen for making the user select foe operation objects and the operation members to invalidate the user operation may be displayed. Then, the control of invalidating the user operation may be executed with the operation objects and the operation members selected by the user on the display screen as the specific operation objects and the specific operation members.

{Operation Example of Information Processing Device}

FIG. 9 is a flowchart illustrating one example of the processing procedure of the invalidation processing by the information processing device 200 in the first embodiment of the present technology. FIG. 9 illustrates an example of invalidating the user operation of the specific operation objects and the specific operation members of the information processing device 200 only when the invalid mode is set when the imaging device 100 is connected by the Wi-Fi and the specific application is activated. Since steps S921, and S923-S925 correspond to steps S901-S904 illustrated in FIG. 6, detailed descriptions here are omitted.

When the imaging device 100 is connected by the Wi-Fi and the specific application is activated (step S921), the control part 250 determines whether or not the invalid mode is set (step S922). For instance, the invalid mode can be set by the pressing operation of the button 321 for setting the invalid mode and the confirmation button 323 on the display screen 320 illustrated in FIG. 8.

When the invalid mode is set (step S922), the control part 250 executes the control of invalidating the user operation of the specific operation objects and the specific operation members of the information processing device 200 (step S923). On the other hand, when the invalid mode is not set (step S922), the user operation of the specific operation objects and the specific operation members of the information processing device 200 is not invalided. Therefore, the operation of the invalidation processing is ended.

In this way, the user operation of the specific operation objects and the specific operation members of the information processing device 200 is invalided only when the invalid mode is set by the user. That is, whether or not to invalid the user operation can be appropriately set according to the preference of the user.

<2. Second Embodiment>

In the first embodiment of the present technology, the example of invalidating the user operation of the specific operation objects and the specific operation members of the information processing device is illustrated. Here, assume that, when the imaging device and the information processing device are mounted, the respective operation objects and operation members are operable. In this case, it is also assumed that the user, when operating one device, accidentally touches the operation member of the other device. Therefore, when the imaging device and the information processing device are mounted, it is important to prevent the erroneous operation by the user by invalidating the operation objects and the operation members of either one of the imaging device and the information processing device.

In the second embodiment of the present technology, an example of invalidating the operation objects and the operation members of either one of the imaging device and the information processing device when the imaging device and the information processing device are mounted is illustrated. The configuration of the imaging device and the information processing device in the second embodiment of the present technology is the same as the imaging device 100 and the information processing device 200 illustrated in FIG. 1 to FIG. 3. Therefore, the same signs as the signs in the first embodiment of the present technology are attached to the individual devices in the second embodiment of the present technology, and some of the descriptions are omitted.

Here, FIG. 10 illustrates an example of invalidating the user operation of the individual operation members of the imaging device 100, and FIG. 11 illustrates an example of invalidating the user operation of the individual operation objects and the Individual operation members of the information processing device 200. The device to invalidate the user operation can be set beforehand. However, when performing be imaging operation using the imaging device 100 and the information processing device 200, it is assumed that the operation members desired to be used are different for each user. For instance, it is assumed that the user desiring to perform the imaging operation using the individual operation members of the imaging device 100 and the user desiring to perform the imaging operation using the individual operation objects and the individual operation members of the information processing device 200 both exist. Therefore, if is preferable to select the device to invalidate the user operation depending on the preference of the user. An example of selecting the device to invalidate the user operation is illustrated in FIG. 12.

{Operation Example of Imaging Device}

FIG. 10 is a flowchart illustrating one example of the processing procedure of the invalidation processing by the imaging device 100 in the second embodiment of the present technology. FIG. 10 illustrates an example of invalidating the user operation of the individual operation members of the imaging device 100 when the imaging device 100 is mounted on the information processing device 200.

First, the control part 140 determines whether or not the imaging device 100 is mounted on the information processing device 200 (step S931). For the engagement detection method, the individual above-described methods can be used.

When the imaging device 100 is mounted on the information processing device 200 (step S931), the control part 140 executes the control of invalidating the user operation of the individual operation members of the imaging device 100 (step S932). For instance, the control part 140 executes the control of invalidating fee user operation of the operation members 161-163 illustrated in FIG. 1 (step S932). In this case, for instance, the user may be notified of the fact that the user operation is invalidated (for instance, display at the display part 170, sound output from the sound output part (not shown in the figure)).

When the imaging device 100 is not mounted on the information processing device 200 (step S931), the control part 140 determines whether or not setting for invalidating the user operation of the individual operation members of the imaging device 100 is performed (step S933). Then, when the setting for invalidating the user operation of the individual operation members of the imaging device 100 is not performed (step S933), the operation of the invalidation processing is ended.

When the setting for invalidating the user operation of the individual operation members of the imaging device 100 is performed (step S933), the control past 140 executes the control of canceling the invalidation of the user operation of the individual operation members (step S934). For instance, the control part 140 executes the control of canceling the invalidation of the user operation of the operation members 161-163 illustrated in FIG. 1 (step S934). In this way, by separating the imaging device 100 and the information processing device 200, the invalidation of the user operation of the individual operation members is canceled and the user operation is validated.

In this way, when the imaging device 100 is mounted on the information processing device 200, the control part 140 executes the control of invalidating the user operation of all the operation members of the imaging device 100.

Here, for instance, assume that the user who mainly uses the operation objects of the information processing device 200 when the imaging device 100 and the information processing device 200 are mounted is performing the imaging operation. In this case, it is assumed that the frequency of using the operation members of the imaging device 100 becomes low. Then, by invalidating the user operation of the operation member of the imaging device 100, whose frequency of use becomes low, the erroneous operation can be reduced.

{Operation Example of Information Processing Device}

FIG. 11 is a flowchart illustrating one example of the processing procedure of the invalidation processing by the information processing device 200 in the second embodiment of the present technology. FIG. 11 illustrates an example of invalidating the user operation of the individual operation objects and the individual operation members of the information processing device 200 when the imaging device 100 is mounted on the information processing device 200.

First, the control part 250 determines whether or not the imaging device 100 is mounted on the information processing device 200 (step S941). For the engagement detection method, the individual above-described methods can be used.

When the imaging device 100 is mounted on the information processing device 200 (step S941), the control part 250 executes the control of invalidating the user operation of the individual operation objects and the individual operation members of the information processing device 200 (step S942). For instance, the control part 250 executes the control of invalidating the user operation of the operation members 221-223 and the operation objects 301-307 and 311-313 illustrated in FIG. 4 (step S942). In this case, for instance, the user may be notified of the fact that the user operation is invalidated (for instance, display at the input/output part 240, sound output from the sound output part 280).

When the imaging device 100 is not mounted on the information processing device 200 (step S941), the control part 250 executes whether or not setting for invalidating the user operation of the individual operation objects and for individual operation members of the information processing device 200 is performed (step S943). Then, when the setting for invalidating the user operation of foe individual operation objects and the individual operation members of the information processing device 200 is not performed (step S943), the operation of the invalidation processing is ended.

When the setting for invalidating the user operation of the individual operation objects and foe individual operation members of the information processing device 200 is performed (step S943), the control part 250 executes the control of canceling the invalidation of the user operation of the individual operation objects and the individual operation members (step S944). For instance, the control part 250 executes the control of canceling the invalidation of the user operation of the operation members 221-223 and the operation objects 301-307 and 311-313 illustrated in FIG. 4 (step S944). In this way, by separating the imaging device 100 and the information processing device 200, the invalidation of the user operation of the individual operation objects and the individual operation members is canceled and the user operation is validated.

In this way, when the imaging device 100 is mounted on the information processing device 200, the control part 250 executes the control of invalidating the user operation of all the operation members (including the input/output part 240) provided in the information processing device 200.

In FIG. 10 and FIG. 11, an example of detecting the engagement inside the individual devices and executing the invalidation processing on the basis of the detection result is illustrated. However, one device may detect the engagement and transmit the detection result to the other device and the other device may execute the invalidation processing on the basis of the detection result. Or, one device may detect the engagement and execute the invalidation processing of the other device on the basis of the detection result. In this case, one device controls the invalidation of the other device using the wireless communication.

For instance, when the imaging device 100 is mounted on the information processing device 200, the control part 250 of the information processing device 200 may execute the control of invalidating the user operation of all the operation members of the imaging device 100. Also, for instance, when the imaging device 100 is mounted on the information processing device 200, the control part 140 of the imaging device 100 may execute the control of invalidating the user operation of all the operation members of the information processing device 200.

{Setting Example of Device to Invalidate User Operation}

FIG. 12 is a diagram illustrating a display example of a display screen displayed at the input/output part 240 in the second embodiment of the present technology. FIG. 12 illustrates one example of a display screen 330 for setting the device to invalidate the user operation of the operation objects and the operation members.

On the display screen 330, an imaging device button 331, an information processing device button 332, and a confirmation button 333 are displayed.

The imaging device button 331 is the button to be pressed when setting the imaging device 100 as the device to invalidate the user operation of the operation members.

The information processing device button 332 is the button to be pressed when setting the information processing device 200 as the device to invalidate the user operation of the operation objects and the operation members.

The confirmation button 333 is the button to be pressed when confirming the pressing operation of the imaging device button 331 or the information processing device button 332.

When a setting operation of setting the imaging device 100 as the device to invalidate the user operation of the operation objects and the operation members (the pressing operation of the imaging device button 331 and the confirmation button 333) is performed, the imaging device 100 is notified of that effect. Thus, the imaging device 100 can recognize that the imaging device 100 is set as the device to invalidate the user operation of the operation objects and the operation members.

In this way, when the imaging device 100 is mounted on the information processing device 200, the control part 250 of the information processing device 200 is capable of executing the control of invalidating the user operation of all the operation members provided in either one of the information processing device 200 and the imaging device 100. Also, when the imaging device 100 is mounted on the information processing device 200, the control part 140 of the imaging device 100 is capable of executing the control of invalidating the user operation of all the operation members provided in either one of the information processing device 200 and the imaging device 100.

<3. Third Embodiment>

In the second embodiment of fee present technology, the example of invalidating the user operation of either one of the devices when the imaging device and the information processing device are mounted is illustrated. Here, the user who desires to invalidate the user operation of either one of the devices even when the imaging device and the information processing device are separated is assumed as well.

In the third embodiment of the present technology, an example of invalidating the user operation of either one of the devices when the imaging device and the information processing device are separated is illustrated. The configuration of the imaging device and the information processing device in the third embodiment of the present technology is the same as the imaging device 100 and the information processing device 200 illustrated in FIG. 1 to FIG. 3. Therefore, the same signs as the signs in the first embodiment of the present technology are attached to the individual devices in the third embodiment of the present technology, and some of the descriptions are omitted.

{Use Example of Imaging Device and Information Processing Device}

FIG. 13 is a diagram illustrating a use example of the imaging device 100 and the information processing device 200 in the third embodiment of the present technology A use example when a user 10 photographs a cat 20 is illustrated in FIG. 13*a*, a use example when the user 10 photographs a butterfly 30 is illustrated in FIG. 13*b*, and a use example when the user 10 photographs a butterfly 40 is illustrated in FIG. 13*c*.

An example of the case of use without attaching the imaging device 100 to the information processing device 200 is illustrated in FIG. 13*a* to FIG. 13*c*. As illustrated in FIG. 13*a* to FIG. 13*c*, for instance, when photographing an object (for instance, the cat 20, the butterfly 30, the butterfly 40) which does not understand an instruction of the user 10, the user 10 is assumed to perform the imaging operation carefully. For instance, the user 10 is assumed to perform the imaging operation while holding the information processing device 200 in one hand (for instance, a left hand) and holding the imaging device 100 in the other hand (for instance, a right hand). In this case, though the user 10 can confirm a view angle (confirm a composition) at the input/output part 240 of the information processing device 200, there is also a risk of getting absorbed in view angle confirmation, touching the display surface of the input/output part 240 and touching the operation members 221-223. Then, in such a case, the user operation of the individual operation objects and the individual operation members of the information processing device 200 is invalidated, and the user operation of the imaging device 100 only is validated. This example is illustrated in FIG. 14.

Also, as illustrated in FIG. 13*b* and FIG. 13*c*, for instance, the user 10 is assumed to perform the imaging operation for an object (for instance, a bug, a flower) at a short distance while holding the information processing device 200 in one hand (for instance, a left hand) and holding the imaging device 100 in the other hand (for instance, a right hand). Also, for instance, the user 10 is assumed to perform the imaging operation with an object (for instance, a bug, a flower) present at a special location (for instance, a narrow location, a high location) as a subject while holding the information processing device 200 in one hand and holding the imaging device 100 in the other hand. In these cases, for instance, it is assumed that a handshake is generated by the operation (for instance, a shutter operation) of the operation member of the imaging device 100. Then, in such a case, the user operation of the individual operation members of the imaging device 100 is invalidated, and the user operation of the information processing device 200 only is validated. This example is illustrated in FIG. 15.

{Operation Example of Information Processing Device}

FIG. 14 is a flowchart illustrating one example of the processing procedure of the invalidation processing by the information processing device 200 in the third embodiment of the present technology. FIG. 14 illustrates an example of invalidating the user operation of the specific operation objects and the specific operation members of the information processing device 200 when the imaging device 100 and the information processing device 200 are separated. Since steps S952, S953, and S954 correspond to steps S942, S943 and S944 illustrated in FIG. 11, detailed descriptions here are omitted.

First the control part 250 determines whether or not the imaging device 100 is mounted on the information processing device 200 (step S951).

When the imaging device 100 is not mounted on the information processing device 200 (step S951), the control part 250 executes the control of invalidating the user operation of the specific operation objects and the specific operation members of the information processing device 200 (step S952). On the other hand, when the imaging device 100 is mounted on the information processing device 200 (step S951), the control part 250 determines whether or not the setting for invalidating the user operation of the specific operation objects and the specific operation members of the information processing device 200 is performed (step S953).

In this way, when the imaging device 100 and the information processing device 200 are separated, the control part 250 executes the control of invalidating the user operation of all the operation, members provided in the information processing device 200.

{Operation Example of Imaging Device}

FIG. 15 is a flowchart illustrating one example of the processing procedure of the invalidation processing by the imaging device 100 in the third embodiment of the present technology. FIG. 15 illustrates an example of invalidating the user operation of the individual operation members of the imaging device 100 when the imaging device 100 and the information processing device 200 are separated. Since steps S962-S964 correspond to steps S932-S934 illustrated in FIG. 10, detailed descriptions here are omitted.

First, the control part 140 determines whether or not the imaging device 100 is mounted on the information processing device 200 (step S961).

When the imaging device 100 is not mounted on the information processing device 200 (step S961), the control part 140 executes the control of invalidating the user operation of the individual operation members of the imaging device 100 (step S962). On the other hand, when the imaging device 100 is mounted on the information processing device 200 (step S961), the control part 140 determines whether or not the setting for invalidating the user operation of the individual operation members of the imaging device 100 is performed (step S963).

In this way, when the imaging device 100 and the information processing device 200 are separated, the control part 140 executes the control of invalidating the user operation of all the operation members provided in the imaging device 100.

In FIG. 14 and FIG. 15, an example of detecting the engagement inside the individual devices and executing the invalidation processing on the basis of the detection result is illustrated. However, one device may detect the engagement and transmit the detection result to the other device and the other device may execute the invalidation processing on the basis of the detection result. Or, one device may detect the engagement and execute the invalidation processing of the other de vice on the basis of the detection result. In this case, one device controls the invalidation of the other device using the wireless communication.

For instance, when the imaging device 100 and the information processing device 200 are separated, the control part 230 of the information processing device 200 may execute the control of invalidating the user operation of all the operation members of the imaging device 100. Also, for instance, when the imaging device 100 and the information processing device 200 are separated, the control part 140 of the imaging device 100 may execute the control of invalidating the user operation of all the operation members of the information processing device 200.

As described above, FIG. 14 illustrates the example of invalidating the user operation of the individual operation objects and the individual operation members of the information processing device 200, and FIG. 15 illustrates the example of invalidating the user operation of the individual operation members of the imaging device 100. Also, similarly to the second embodiment of the present technology, the device to invalidate the user operation may be set beforehand, or the user may select the device to invalidate the user operation. For instance, using the display screen corresponding to FIG. 12, the device to invalidate the user operation of the operation objects and the operation members can be set.

That is, when the imaging device 100 and the information processing device 200 are separated, the control part 250 of the information processing device 200 is capable of executing the control of invalidating the user operation of all the operation members provided in either one of the information processing device 200 and the imaging device 100. Also, when the imaging device 100 and the information processing device 200 are separated, the control part 140 of the imaging device 100 is capable of executing the control of invalidating the user operation of all the operation members provided in either one of the information processing device 200 and the imaging device 100.

In the second and third embodiments of the present technology, the example of invalidating the user operation of either one of the imaging device 100 and the information processing device 200 is illustrated. However, for instance, only the user operation of the operation members in common to the individual devices (the operation members of a common function (camera function)) among the operation members (operation objects) of each of the imaging device 100 and the information processing device 200 may be invalidated. In this case, for instance, for the operation members (operation objects) in common to the individual devices, the operation members (operation objects) of either one of the devices are validated, and the operation members (operation objects) of the other device are invalidated. Also, the user may be able to select the device to validate the operation members (operation objects).

In this way, in the embodiment of the present technology, during the imaging operation using the imaging device 100 and the information processing device 200, all or some of the user operation are invalidated. Thus, the individual devices are prevented from performing the operation not intended by the user, and the malfunction not intended by the user can be prevented.

While the embodiment of the present technology is described taking a cylindrical (columnar) imaging device 100 as an example, the embodiment of the present technology is applicable also to the imaging devices in other shapes, that can be attached to the other device. Also, the embodiment of the present technology is described taking the information processing device 200 such as a smartphone or table terminal or the like as an example, the embodiment of the present technology is applicable also to the other devices that can be connected with the imaging device utilizing the wireless communication.

Also, in the embodiment of the present technology, the examples of the imaging device and the information processing device are described, however, the embodiment of the present technology is applicable also to between the other devices. For instance, the embodiment of the present technology is applicable to a light emitting device and the imaging device (for instance, a digital still camera) to be used when photographing still images. Also, the embodiment of the present technology is applicable to a sound collecting device (for instance, a microphone) and the imaging device (for instance, a camera incorporated type recorder) to be used when photographing moving images. Also, the embodiment of the present technology is applicable to a sound output device (for instance, a speaker) and the imaging device (for instance, a camera incorporated type recorder) to be used when reproducing moving images.

Also, for instance, the embodiment of the present technology is applicable to a sound collecting device (for instance, a microphone) and the information processing device. Also, the embodiment of the present technology is applicable to a sound output device (for instance, a speaker) and the information processing device to be used when reproducing moving images. That is, the embodiment of the present technology can be recognized as an example of the device which executes the control of invalidating the user operation of at least one of the individual operation members provided in each of the individual devices in the case where the plurality of devices are connected with each other using wireless communication.

Also, the above-described embodiment illustrates one example for realizing the present technology, and matters in the embodiment and technology specifying matters in the scope of claims have correspondence relation respectively. Similarly, the technology specifying matters in the scope of claims and the matters in the embodiment of the present technology, to which the same names are attached, have the correspondence relation respectively. However, the present technology is not limited to the embodiment and can be realized by variously modifying the embodiment without departing from the spirit of the technology.

Also, the processing procedures described in the above embodiment may be recognized as a method having a series of the procedures, or may be recognized as a program for making a computer execute a series of the procedures or a non-transitory computer-readable recording medium having the program recorded thereon. As the recording medium, for instance, a computer disc (CD), a minidisc (MD), a digital versatile disc (DVD), a memory card, and a Blu-ray (R) disc or the like are usable.

Effects described in the present description are just examples, the effects are not limited, and there may be other effects.

Additionally, the present technology may also be configured as below.

(1) An information acquiring device comprising: an information acquiring control circuit configured to prevent an operation of the information processing device and/or an information acquiring device based on the presence of a connection between the information acquiring device and the information processing device.

(2) The information acquiring device according to (1), wherein the information acquiring device is an imaging device.

(3) The information acquiring device according to (1) or (2), wherein the information processing device is a portable communication device.

(4) The information acquiring device according to any one of (1) to (3), wherein the connection is a physical attachment between the information acquiring device to the information processing device.

(5) The information acquiring device according to any one of (1) to (4), wherein the connection is a communication link between the information acquiring device and the information processing device.

(6) The information acquiring device according to any one of (1) to (5), wherein the communication link is one of a near field communication, a wireless local area network, Bluetooth, an infrared communication, portable radio waves, and combinations thereof.

(7) The information acquiring device according to any one of (1) to (6), wherein the information acquiring control circuit is configured to prevent an operation of at least one of an input part, an output part an operation member, and combinations thereof.

(8) The information acquiring device according to any one of (1) to (7), wherein the information acquiring control circuit is configured to stop preventing the operation of the information processing device and/or the information acquiring device based on the absence of the connection between the information acquiring device and the information processing device.

(9) The information acquiring device according to any one of (1) to (8), wherein the information acquiring control circuit is configured to stop preventing the operation of the information processing device and/or the information acquiring device based on a user command to the information processing device and/or the information acquiring device.

(10) An information processing device comprising: an information processing control circuit configured to prevent an operation of the information processing device and/or an information acquiring device based on the presence of a connection between the information acquiring device and foe information processing device.

(11) The information processing device according to (10), wherein the information acquiring device is an imaging device.

(12) The information processing device according to (10) or (11), wherein the information processing device is a portable communication device.

(13) The information processing device according to anyone of (10) to (12), wherein the connection is a physical attachment between the information acquiring device to the information processing device.

(14) The information processing device according to any one of (10) to (13), wherein the connection is a communication link between the information acquiring device and the information processing device.

(15) The information processing device according to any one of (10) to (14), wherein the communication link is one of a near field communication, a wireless local area network, Bluetooth, an infrared communication, portable radio waves, and combinations thereof.

(16) The information processing device according to any one of (10) to (15), wherein the information processing control circuit is configured to prevent an operation of at least one of an input part, an output part, an operation member, and combinations thereof.

(17) The information processing device according to any one of (10) to (16), wherein the information processing control circuit is configured to stop preventing the operation of the information processing device and/or the information acquiring device based on the absence of the connection between the information acquiring device and the information processing device.

(18) The information processing device according to any one of (10) to (17), wherein the information processing control circuit is configured to stop preventing the operation of the information processing device and/or the information acquiring device based on a user command to the information processing device and/or the information acquiring device.

(19) A non-transitory computer readable medium containing thereon instructions which, when executed, cause one or more processors to perform: preventing an operation of an information processing device and/or an information acquiring device based on the presence of a connection between the information acquiring device and the information processing device.

(A01) An information processing device including:
a control part configured to execute control of invalidating a user operation of at least one of operation members of the information processing device or an imaging device when the information processing device and the imaging device are connected using wireless communication.

(A02) The information processing device according to (A01),
wherein the control part executes the control of invalidating the user operation of the operation members also used for operations other than an imaging operation among the operation members of the information processing device when performing the imaging operation using the imaging device.

(A03) The information processing device according to (A01) or (A02),
wherein the control part executes the control of invalidating the user operation of the operation members also used for operations other than an imaging operation using the imaging device among the operation members of the information processing device when the imaging device is mounted on the information processing device.

(A04) The information processing device according to any one of (A01) to (A03),
wherein the control part executes the control of invalidating the user operation of at least one of operation objects that are displayed at an input/output part provided in the information processing device and that receive the user operation.

(A05) The information processing device according to (A04),
wherein the control past executes the control of invalidating the user operation of the operation objects also used for operations other than an imaging operation among the operation objects displayed at the input/output part when performing the imaging operation using the imaging device.

(A06) The information processing device according to (A04) or (A05),
wherein the control part executes the control of invalidating the user operation of the operation objects also used for operations other than an imaging operation using the imaging device among the operation objects displayed at the input/output part when the imaging device is mounted on the information processing device.

(A07) The information processing device according to any one of (A01) to (A06), wherein the control part executes the control of invalidating the user operation of all the operation members provided in either one of the information processing device and the imaging device when the imaging device is mounted on the information processing device.

(A08) The information processing device according to any one of (A01) to (A06),
wherein the control part executes the control of invalidating the user operation of all the operation members provided in either one of the information processing device and the imaging device when the imaging device and the information processing device are separated.

(A09) An imaging device including:
a control part configured to execute control of invalidating a user operation of at least one of operation members of an information processing device or the imaging device when the information processing device and the imaging device are connected using wireless communication.

(A10) The imaging device according to (A09),
wherein the control part executes the control of invalidating the user operation of the operation members also used for operations other than an imaging operation among the operation members of the information processing device when performing the imaging operation using the imaging device.

(A11) The imaging device according to (A09) or (A10),
wherein the control part executes the control of invalidating the user operation of the operation members also used for operations other than an imaging operation using the imaging device among the operation members of the information processing device when the imaging device is mounted on the information processing device.

(A12) The imaging device according to any one of (A09) to (A11),
wherein the control part executes the control of invalidating the user operation of at least one of operation objects that are displayed at an input/output part provided in the information processing device and that receive the user operation.

(A13) The imaging device according to (A12),
wherein the control part executes the control of invalidating the user operation of the operation objects also used for operations other than an imaging operation among the operation objects displayed at the input/output part when performing Use imaging operation using the imaging device.

(A14) The imaging device according to (A12) or (A13),
wherein the control part executes the control of invalidating the user operation of the operation objects also used for operations other than an imaging operation using the imaging device among the operation objects displayed at the input/output part when the imaging device is mounted on the information processing device.

(A15) The imaging device according to any one of (A09) to (A14),
wherein the control part executes the control of invalidating the user operation of all the operation members provided in either one of the information processing device and the imaging device when the imaging device is mounted on the information processing device.

(A16) The imaging device according to any one of (A09) to (A14),
wherein the control part executes the control of invalidating the riser operation of all the operation members provided in either one of the information processing device and the imaging device when the imaging device and the information processing device are separated.

(A17) An imaging system including:
a control part configured to execute control of invalidating a user operation of at least one of operation members of an information processing device or an imaging device when the information processing device and the imaging device are connected using wireless communication.

(A18) An information processing method including:
invalidating a user operation of at least one of operation members of an information processing device or an imaging device when the information processing device and the imaging device are connected using wireless communication.

(A19) A program for causing a computer to execute a procedure of invalidating a user operation of at least one of operation members of an information processing device or an imaging device when the information processing device and the imaging device are connected using wireless communication.

It should be understood by those skilled in the art that various modifications. combinations, sub-combinations and alterations may occur depending on design requirements and other factors insofar as they are within the scope of the appended claims or the equivalents thereof.

Reference Signs List 100 imaging device
110 imaging part
120 image processing part
130 storage part
140 control part
150 wireless communication part
160 operation reception part
161-163 operation member
170 display part
180 lens barrel
191 192 attachment member
200 information processing device
210 posture detection part
220 operation reception part
221-223 operation member
230 wireless communication part
240 input/output part
241 input part
242 display past
250 control part
260 image processing part
270 storage part
280 sound output part
291 light emitting part
292 imaging part

What is claimed is:
1. An information acquiring device, comprising:
an information acquiring control circuit configured to:
determine a connection between the information acquiring device and an information processing device;
activate at least one imaging operation of at least one of the information processing device or the information acquiring device based on the determination of the connection between the information acquiring device and the information processing device;
prevent activation of at least one non-imaging operation of the at least one of the information processing device or the information acquiring device based on the activation of the at least one imaging operation of the at least one of the information acquiring device or the information processing device; and
output a notification indicating the prevention of the activation of the at least one non-imaging operation of the at least one of the information processing device or the information acquiring device.

2. The information acquiring device according to claim 1, wherein the information acquiring device is an imaging device.

3. The information acquiring device according to claim 1, wherein the information processing device is a portable communication device.

4. The information acquiring device according to claim 1, wherein the connection is a physical attachment between the information acquiring device and the information processing device.

5. The information acquiring device according to claim 1, wherein the connection is a communication link between the information acquiring device and the information processing device.

6. The information acquiring device according to claim 5, wherein the communication link is one of a near field communication, a wireless local area network, Bluetooth, an infrared communication, or portable radio waves.

7. The information acquiring device according to claim 1, wherein the information acquiring control circuit is further configured to prevent an operation of at least one of an input part or an output part of the at least one of the information acquiring device or the information processing device.

8. The information acquiring device according to claim 1, wherein the information acquiring control circuit is further configured to:
  determine a disconnection between the information acquiring device and the information processing device; and
  stop the prevention of the activation of the at least one non-imaging operation of the at least one of the information processing device or the information acquiring device based on the determination of the disconnection between the information acquiring device and the information processing device.

9. The information acquiring device according to claim 8, wherein the information acquiring control circuit is further configured to stop the prevention of the activation of the at least one non-imaging operation of the at least one of the information processing device or the information acquiring device based on a user command to at least one of the information processing device or the information acquiring device.

10. An information processing device, comprising:
  an information processing control circuit configured to:
    determine a connection between an information acquiring device and the information processing device;
    activate at least one imaging operation of at least one of the information processing device or the information acquiring device based on the determination of the connection between the information acquiring device and the information processing device;
    prevent activation of at least one non-imaging operation of the at least one of the information processing device or the information acquiring device based on the activation of the at least one imaging operation of the at least one of the information acquiring device or the information processing device; and
    output a notification indicating the prevention of the activation of the at least one non-imaging operation of the at least one of the information processing device or the information acquiring device.

11. The information processing device according to claim 10, wherein the information acquiring device is an imaging device.

12. The information processing device according to claim 10, wherein the information processing device is a portable communication device.

13. The information processing device according to claim 10, wherein the connection is a physical attachment between the information acquiring device and the information processing device.

14. The information processing device according to claim 10, wherein the connection is a communication link between the information acquiring device and the information processing device.

15. The information processing device according to claim 14, wherein the communication link is one of a near field communication, a wireless local area network, Bluetooth, an infrared communication, or portable radio waves.

16. The information processing device according to claim 10, wherein the information processing control circuit is further configured to prevent an operation of at least one of an input part or an output part of the at least one of the information acquiring device or the information processing device.

17. The information processing device according to claim 10, wherein the information processing control circuit is further configured to:
  determine a disconnection between the information acquiring device and the information processing device; and
  stop the prevention of the activation of the at least one non-imaging operation of the at least one of the information processing device or the information acquiring device based on the determination of the disconnection between the information acquiring device and the information processing device.

18. The information processing device according to claim 17, wherein the information processing control circuit is further configured to stop the prevention of the activation of the at least one non-imaging operation of the at least one of the information processing device or the information acquiring device based on a user command to at least one of the information processing device or the information acquiring device.

19. A non-transitory computer-readable medium having stored thereon computer-executable instructions that, when executed by a computer, cause the computer to execute operations, the operations comprising:
  determining a connection between an information acquiring device and an information processing device;
  activating at least one imaging operation of at least one of the information processing device or the information acquiring device based on the determination of the connection between the information acquiring device and the information processing device;
  preventing activation of at least one non-imaging operation of the at least one of the information processing device or the information acquiring device based on the activation of the at least one imaging operation of the at least one of the information acquiring device or the information processing device; and
  outputting a notification indicating the prevention of the activation of the at least one non-imaging operation of at least one of the information processing device or the information acquiring device.

* * * * *